(12) United States Patent
Shih et al.

(10) Patent No.: US 11,536,933 B2
(45) Date of Patent: Dec. 27, 2022

(54) LENS ASSEMBLY

(71) Applicants: Sintai Optical (Shenzhen) Co., Ltd., ShenZhen (CN); Asia Optical Co., Inc., Taichung (TW)

(72) Inventors: Po-Yuan Shih, Taichung (TW); Bo-Yan Chen, Taichung (TW); Hsi-Ling Chang, Taichung (TW)

(73) Assignees: SINTAI OPTICAL (SHENZHEN) CO., LTD., Shenzhen (CN); ASIA OPTICAL CO., INC., Taichung (TW)

( * ) Notice: Subject to any disclaimer, the term of this patent is extended or adjusted under 35 U.S.C. 154(b) by 142 days.

(21) Appl. No.: 16/992,216

(22) Filed: Aug. 13, 2020

(65) Prior Publication Data

US 2020/0371313 A1    Nov. 26, 2020

Related U.S. Application Data

(63) Continuation of application No. 15/859,842, filed on Jan. 2, 2018, now Pat. No. 10,782,503.

(30) Foreign Application Priority Data

May 3, 2017 (CN) .......................... 201710303279.4

(51) Int. Cl.
*G02B 13/00* (2006.01)
*G02B 9/38* (2006.01)
(Continued)

(52) U.S. Cl.
CPC ............. *G02B 13/004* (2013.01); *G02B 9/38* (2013.01); *G02B 9/50* (2013.01); *G02B 9/62* (2013.01); *G02B 13/0045* (2013.01); *G02B 5/20* (2013.01)

(58) Field of Classification Search
CPC ... G02B 9/62; G02B 9/50; G02B 9/38; G02B 13/0045; G02B 13/004
(Continued)

(56) References Cited

U.S. PATENT DOCUMENTS 9,217,848 B1    12/2015   Chen et al.
9,645,357 B2     5/2017   Liu et al.
(Continued)

FOREIGN PATENT DOCUMENTS

JP    2012042766 A  *  3/2012
TW     201416702 A      5/2014
(Continued)

*Primary Examiner* — James R Greece
(74) *Attorney, Agent, or Firm* — McClure, Qualey & Rodack, LLP

(57) ABSTRACT

A lens assembly includes a first lens, a second lens, a third lens, a fourth lens, a fifth lens, and a sixth lens, all of which are arranged in order from an object side to an image side along an optical axis. The first lens is with positive refractive power and includes a convex surface facing the object side. The second lens is with negative refractive power and includes a concave surface facing the image side. The third lens is with refractive power and includes a convex surface facing the image side. The fourth, fifth, and sixth lenses are with refractive power. The lens assembly satisfies: 2 mm<$f_5+f_6$<35 mm, wherein $f_5$ is an effective focal length of the fifth lens and $f_6$ is an effective focal length of the sixth lens.

20 Claims, 20 Drawing Sheets

(51) Int. Cl.
*G02B 9/62* (2006.01)
*G02B 9/50* (2006.01)
*G02B 5/20* (2006.01)

(58) Field of Classification Search
USPC .......................................................... 359/738
See application file for complete search history.

(56) References Cited

U.S. PATENT DOCUMENTS

| | | |
|---|---|---|
| 10,605,964 B2 | 3/2020 | Jung et al. |
| 2009/0009889 A1 | 1/2009 | Teraoka et al. |
| 2009/0109552 A1 | 4/2009 | You et al. |
| 2012/0044583 A1 | 2/2012 | Ise et al. |
| 2012/0194925 A1 | 8/2012 | Teraoka |
| 2013/0038947 A1 | 2/2013 | Tsai et al. |
| 2015/0009578 A1* | 1/2015 | Shinohara ................ G02B 9/64 359/708 |
| 2016/0109688 A1 | 4/2016 | Jo |
| 2016/0306143 A1 | 10/2016 | Hashimoto et al. |
| 2017/0017064 A1 | 1/2017 | Jo et al. |
| 2017/0102552 A1 | 4/2017 | Otsubo |

FOREIGN PATENT DOCUMENTS

| | | |
|---|---|---|
| TW | 201508317 A | 3/2015 |
| TW | 201641976 A | 12/2016 |

\* cited by examiner

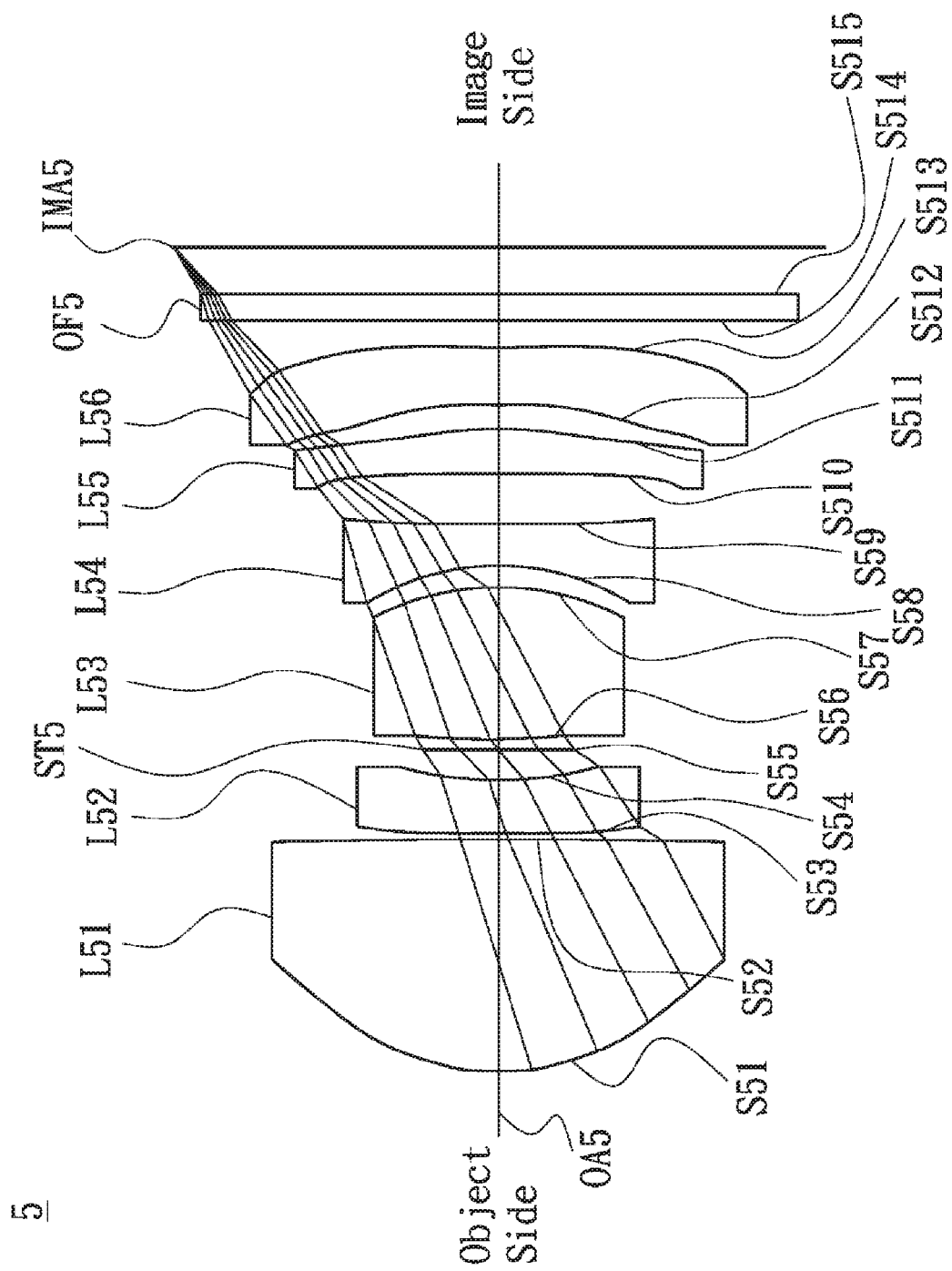

LENS ASSEMBLY

CROSS REFERENCE TO RELATED APPLICATIONS

This application is a Continuation of U.S. patent application Ser. No. 15/859,842, filed Jan. 2, 2018 and entitled "Lens Assembly", issued on Sep. 22, 2020 as U.S. Pat. No. 10,782,503.

BACKGROUND OF THE INVENTION

Field of the Invention

The invention relates to a lens assembly.

Description of the Related Art

The current development trend of a lens assembly is toward miniaturization. Additionally, the lens assembly is developed to have small field of view and high resolution capability in accordance with different application requirements. However, the known lens assembly can't satisfy such requirements. Therefore, the lens assembly needs a new structure in order to meet the requirements of miniaturization, small field of view, and high resolution at the same time.

BRIEF SUMMARY OF THE INVENTION

The invention provides a lens assembly to solve the above problems. The lens assembly of the invention is provided with characteristics of a shortened total lens length, a smaller field of view, a higher resolution, and still has a good optical performance.

The lens assembly in accordance with an exemplary embodiment of the invention includes a first lens, a second lens, a third lens, a fourth lens, a fifth lens, and a sixth lens, all of which are arranged in order from an object side to an image side along an optical axis. The first lens is with positive refractive power and includes a convex surface facing the object side. The second lens is with negative refractive power and includes a concave surface facing the image side. The third lens is with refractive power and includes a convex surface facing the image side. The fourth, fifth, and sixth lenses are with refractive power. The lens assembly satisfies: 2 mm<$f_5+f_6$<35 mm, wherein $f_5$ is an effective focal length of the fifth lens and $f_6$ is an effective focal length of the sixth lens.

The lens assembly in accordance with another exemplary embodiment of the invention includes a first lens, a second lens, a third lens, a fourth lens, a fifth lens, and a sixth lens, all of which are arranged in order from an object side to an image side along an optical axis. The first lens is with positive refractive power and includes a convex surface facing the object side. The second lens is with negative refractive power and includes a concave surface facing the image side. The third lens is with refractive power and includes a convex surface facing the image side. The fourth, fifth, and sixth lenses are with refractive power. The lens assembly satisfies: $-21.5 \leq (R_{41}-R_{42})/(R_{41}+R_{42}) \leq 3.5$, wherein $R_{41}$ is a radius of curvature of an object side surface of the fourth lens and $R_{42}$ is a radius of curvature of an image side surface of the fourth lens.

The lens assembly in accordance with yet another exemplary embodiment of the invention includes a first lens, a second lens, a third lens, a fourth lens, a fifth lens, a sixth lens, and a stop. The first lens is with positive refractive power and includes a convex surface facing an object side. The second lens is with negative refractive power and includes a concave surface facing an image side. The third lens is with refractive power and includes a convex surface facing the image side. The fourth, fifth, and sixth lenses are with refractive power. The first lens, the second lens, the third lens, the fourth lens, the fifth lens, and the sixth lens are arranged in order from the object side to the image side along an optical axis. The stop is disposed between the object side and the third lens. The lens assembly satisfies: 4 mm<TTL−SL<9 mm, wherein TTL is an interval from the convex surface of the first lens to an image plane along the optical axis and SL is an interval from the convex surface of the first lens to the stop along the optical axis.

In another exemplary embodiment, the third lens is with positive refractive power and the fourth lens is with negative refractive power.

In yet another exemplary embodiment, the fifth lens is with positive refractive power and the sixth lens is with negative refractive power.

In another exemplary embodiment, the second lens further includes another concave surface facing the object side, the third lens further includes another convex surface facing the object side, the fourth lens is a biconcave lens, the sixth lens is a biconcave lens.

In yet another exemplary embodiment, the fifth lens is a biconvex lens.

In another exemplary embodiment, the first lens further includes a concave surface facing the image side.

In yet another exemplary embodiment, the first lens further includes another convex surface facing the image side.

In another exemplary embodiment, the fifth lens is a meniscus lens.

In yet another exemplary embodiment, the first lens further includes a concave surface facing the image side.

In another exemplary embodiment, the first lens further includes another convex surface facing the image side.

In yet another exemplary embodiment, the lens assembly satisfies: $-21.5 \leq (R_{41}-R_{42})/(R_{41}+R_{42}) \leq 3.5$, wherein $R_{41}$ is a radius of curvature of an object side surface of the fourth lens and $R_{42}$ is a radius of curvature of an image side surface of the fourth lens.

In another exemplary embodiment, the lens assembly further includes a stop disposed between the object side and the third lens, wherein the lens assembly satisfies: 4 mm<TTL−SL<9 mm, wherein TL is an interval from the convex surface of the first lens to an image plane along the optical axis and SL is an interval from the convex surface of the first lens to the stop along the optical axis.

In yet another exemplary embodiment, the lens assembly satisfies: $f_1+f_2<-1$ mm, wherein $f_1$ is an effective focal length of the first lens and $f_2$ is an effective focal length of the second lens.

In another exemplary embodiment, the lens assembly satisfies: $-4 \leq -f/f \leq 0$, wherein $f_2$ is an effective focal length of the second lens and f is an effective focal length of the lens assembly.

In yet another exemplary embodiment, the lens assembly satisfies: 25<$V_1-V_2$<38, wherein $V_1$ is an Abbe number of the first lens and $V_2$ is an Abbe number of the second lens.

In another exemplary embodiment, the lens assembly satisfies: −25 mm<$f_2+f_4$<−1.5 mm, wherein $f_2$ is an effective focal length of the second lens and $f_4$ is an effective focal length of the fourth lens.

In yet another exemplary embodiment, the lens assembly satisfies: FOV≤56°, wherein FOV is a field of view of the lens assembly.

In yet another exemplary embodiment, the first lens, the second lens, the third lens, the fourth lens, the fifth lens, and the sixth lenses are aspheric lenses.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 9 is a lens layout and optical path diagram of a lens assembly in accordance with a fifth embodiment of the invention;

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
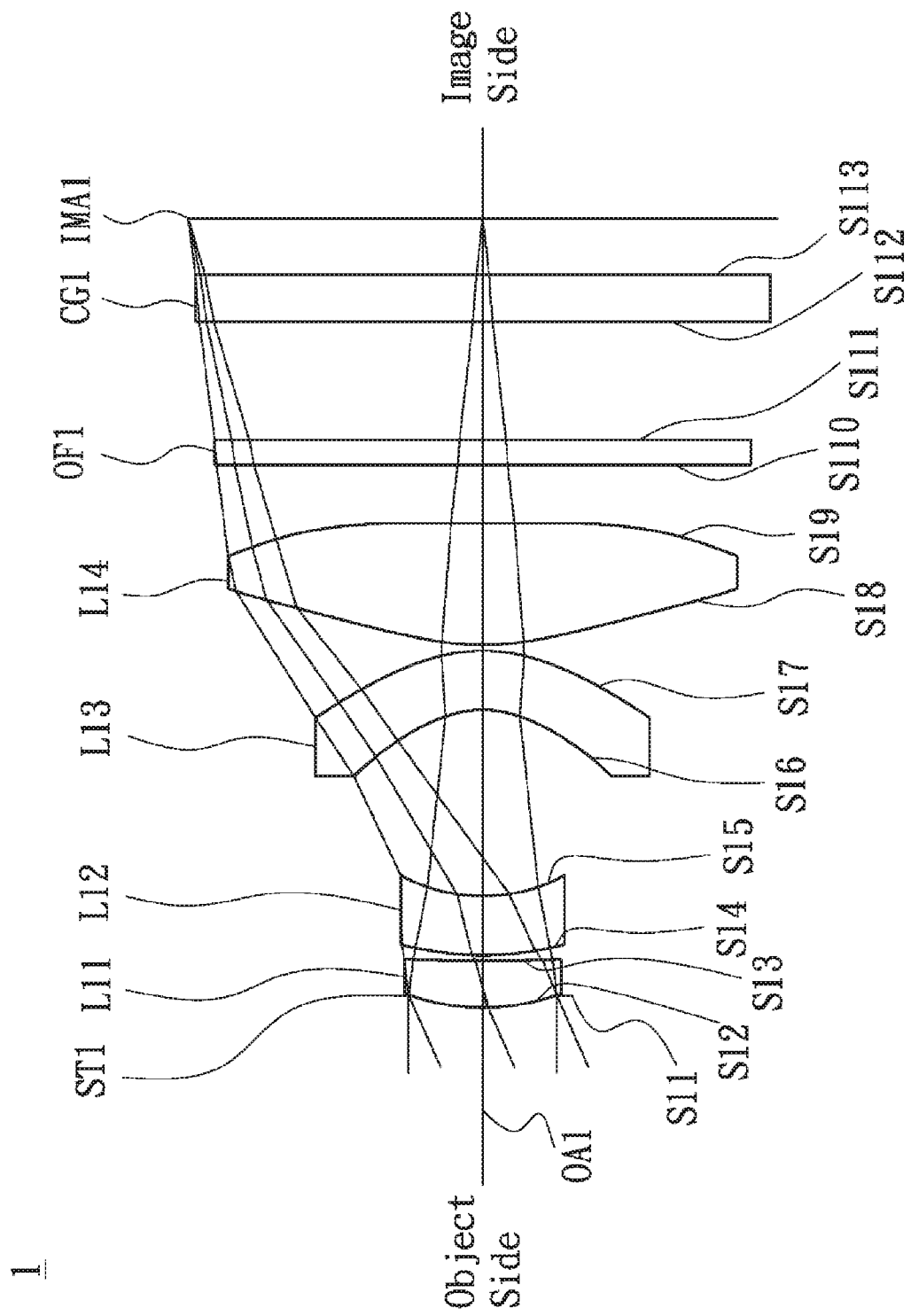
FIG. 1 is a lens layout and optical path diagram of a lens assembly in accordance with a first embodiment of the invention.

Referring to FIG. 1, FIG. 1 is a lens layout and optical path diagram of a lens assembly in accordance with a first embodiment of the invention. The lens assembly 1 includes a stop ST1, a first lens L11, a second lens L12, a third lens L13, a fourth lens L14, an optical filter OF1, and a cover glass CG1, all of which are arranged in order from an object side to an image side along an optical axis OA1. In operation, an image of light rays from the object side is formed at an image plane IMA1.

The first lens L11 is a meniscus lens with positive refractive power and made of glass material, wherein the object side surface S12 is a convex surface, the image side surface S13 is a concave surface, and both of the object side surface S12 and image side surface S13 are aspheric surfaces.

The second lens L12 is a meniscus lens with negative refractive power and made of plastic material, wherein the object side surface S14 is a convex surface, the image side surface S15 is a concave surface, and both of the object side surface S14 and image side surface S15 are aspheric surfaces.

The third lens L13 is a meniscus lens with negative refractive power and made of plastic material, wherein the object side surface S16 is a concave surface, the image side surface S17 is a convex surface, and both of the object side surface S16 and image side surface S17 are aspheric surfaces.

The fourth lens L14 is a meniscus lens with positive refractive power and made of plastic material, wherein the object side surface S18 is a convex surface, the image side surface S19 is a concave surface, and both of the object side surface S18 and image side surface S19 are aspheric surfaces.

Both of the object side surface S110 and image side surface S111 of the optical filter OF1 are plane surfaces.

Both of the object side surface S112 and image side surface S113 of the cover glass CG1 are plane surfaces.

In order to maintain excellent optical performance of the lens assembly in accordance with the first embodiment of the invention, the lens assembly 1 satisfies at least one of the following conditions:

$$FOV1 \leq 56° \tag{1}$$

$$4 \text{ mm} < TTL1-SL1 < 9 \text{ mm} \tag{2}$$

$$fl_1+fl_2 < -1 \text{ mm} \tag{3}$$

$$-4 \leq fl_2/fl_1 \leq 0 \tag{4}$$

$$25 < V1_1-V1_2 < 38 \tag{5}$$

$$-21.5 \leq (R1_{41}-R1_{42})/(R1_{41}+R1_{42}) \leq 3.5 \tag{6}$$

$$-25 \text{ mm} < fl_2+fl_4 < -1.5 \text{ mm} \tag{7}$$

wherein FOV1 is a field of view in degree for the lens assembly 1, TTL1 is an interval from the object side surface S12 of the first lens L11 to the image plane IMA1 along the optical axis OA1, SL1 is an interval from the object side surface S12 of the first lens L11 to the stop ST1 along the optical axis OA, $fl_1$ is an effective focal length of the first lens L11, $fl_2$ is an effective focal length of the second lens L12, $fl_4$ is an effective focal length of the fourth lens L14, f1 is an effective focal length of the lens assembly 1, $V1_1$ is an Abbe number of the first lens L11, $V1_2$ is an Abbe number of the second lens L12, $R1_{41}$ is a radius of curvature of the object side surface S18 of the fourth lens L14, and $R1_{42}$ is a radius of curvature of the image side surface S19 of the fourth lens L14.

By the above design of the lenses, stop ST1, and satisfies at least one of the conditions (1)-(7), the lens assembly 1 is provided with an effective shortened total lens length, an effective decreased field of view, an increased resolution, and an effective corrected aberration.

In order to achieve the above purposes and effectively enhance the optical performance, the lens assembly 1 in accordance with the first embodiment of the invention is provided with the optical specifications shown in Table 1, which include the effective focal length, F-number, total lens length, field of view, radius of curvature of each lens surface, thickness between adjacent surface, refractive index of each lens, Abbe number of each lens, and effective focal length of each lens. Table 1 shows that the effective focal length is equal to 5.4619 mm, F-number is equal to 4.5, total lens length is equal to 6.688 mm, and field of view is equal to 43.9779 degrees for the lens assembly 1 of the first embodiment of the invention.

TABLE 1

Effective Focal Length = 5.4619 mm F-number = 4.5
Total Lens Length = 6.688 mm Field of View = 43.9779 Degrees

| Surface Number | Radius of Curvature (mm) | Thickness (mm) | Nd | Vd | Effective Focal Length (mm) | Remark |
|---|---|---|---|---|---|---|
| S11 | ∞ | 0.000 | | | | Stop ST1 |
| S12 | 1.852 | 0.395 | 1.589 | 61.2 | 3.51310 | The First Lens L11 |
| S13 | 16.186 | 0.050 | | | | |
| S14 | 2.591 | 0.500 | 1.636 | 23.9 | -6.02370 | The Second Lens L12 |
| S15 | 1.429 | 1.578 | | | | |
| S16 | -0.853 | 0.500 | 1.636 | 23.9 | -5.11500 | The Third Lens L13 |
| S17 | -1.420 | 0.050 | | | | |
| S18 | 2.103 | 1.030 | 1.535 | 55.7 | 4.1985 | The Fourth Lens L14 |
| S19 | 27.234 | 0.500 | | | | |
| S110 | ∞ | 0.210 | 1.517 | 64.2 | | Optical Filter OF1 |
| S111 | ∞ | 1.426 | | | | |
| S112 | ∞ | 0.400 | 1.517 | 64.2 | | Cover Glass CG1 |
| S113 | ∞ | 0.050 | | | | |

The aspheric surface sag z of each lens in table 1 can be calculated by the following formula:

$$z = ch^2/\{1+[1-(k+1)c^2h^2]^{1/2}\}+Ah^4+Bh^6+Ch^8+Dh^{10}$$

where c is curvature, h is the vertical distance from the lens surface to the optical axis, k is conic constant and A, B, C and D are aspheric coefficients.

In the first embodiment, the conic constant k and the aspheric coefficients A, B, C, D of each surface are shown in Table 2.

TABLE 2

| Surface Number | S12 | S13 | S14 | S15 |
|---|---|---|---|---|
| K | -3.5527E-01 | 0.0000E+00 | -1.6190E+00 | -2.9888E-02 |
| A | 3.8319E-03 | -8.7036E-03 | -2.2288E-03 | -5.4284E-02 |
| B | -4.7768E-03 | 1.7903E-05 | 6.5077E-03 | 6.2554E-03 |
| C | 0.0000E+00 | 6.5897E-03 | 1.1869E-04 | 8.6668E-03 |
| D | 0.0000E+00 | 0.0000E+00 | 7.0890E-05 | 9.8377E-03 |

| Surface Number | S16 | S17 | S18 | S19 |
|---|---|---|---|---|
| K | -2.3851E+00 | -2.1665E+00 | -9.4074E+00 | 0.0000E+00 |
| A | -5.1997E-02 | -1.2031E-02 | -1.1391E-02 | -2.9667E-02 |
| B | -2.0059E-02 | 2.2708E-03 | 4.4922E-03 | 3.3095E-03 |
| C | 3.5820E-02 | 5.3712E-03 | -1.0136E-03 | 6.4504E-04 |
| D | -1.7535E-02 | -2.0000E-03 | 1.1801E-04 | -1.1033E-04 |

Table 3 shows the parameters and condition values for conditions (1)-(7). As can be seen from Table 3, the lens assembly 1 of the first embodiment satisfies the conditions (1)-(7).

TABLE 3

| | | | | | |
|---|---|---|---|---|---|
| FOV1 | 43.9779 Degrees | TTL1 | 6.688 mm | SL1 | 0 mm |
| $fl_1$ | 3.5131 mm | $fl_2$ | -6.02370 mm | $fl_4$ | 4.1985 mm |
| fl | 5.4619 mm | $V1_1$ | 61.2 | $V1_2$ | 23.9 |
| $R1_{41}$ | 2.103 mm | $R1_{42}$ | 27.234 mm | | |
| FOV1 | 43.9779 Degrees | TTL1 - SL1 | 6.688 mm | $fl_1 + fl_2$ | -2.511 mm |
| $fl_2 + fl_4$ | -1.825 mm | $fl_2/fl$ | -1.103 | $V1_1 - V1_2$ | 37.3 |
| $(R1_{41} - R1_{42})/(R1_{41} + R1_{42})$ | -0.857 | | | | |

Figure 2A:
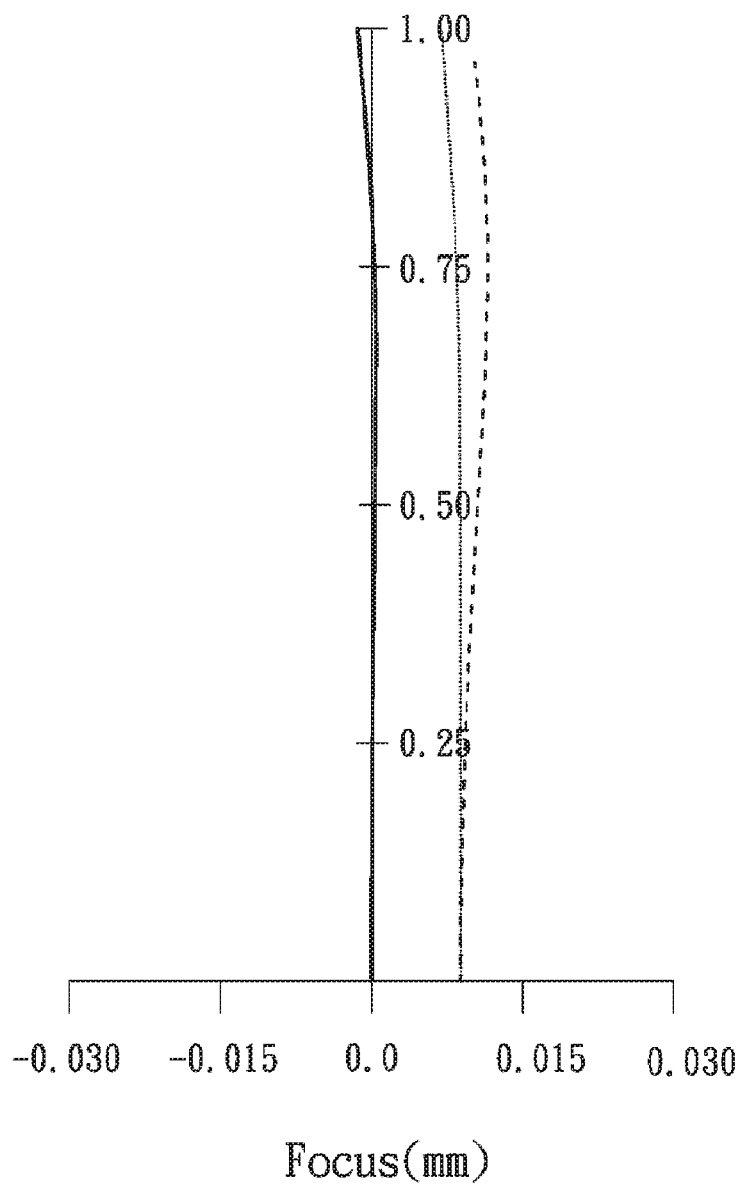
FIG. 2A depicts a longitudinal spherical aberration of the lens assembly in accordance with the first embodiment of the invention.
Figure 2B:
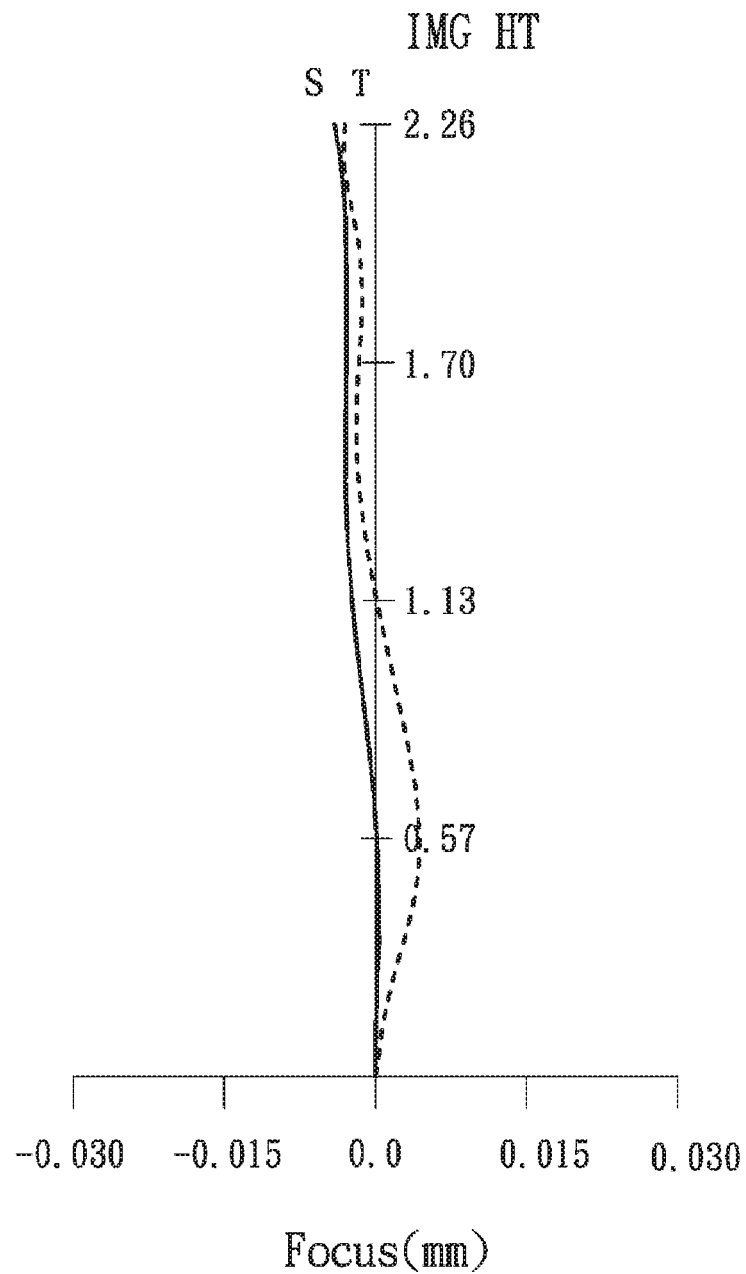
FIG. 2B is an astigmatic field curves diagram of the lens assembly in accordance with the first embodiment of the invention.
Figure 2C:
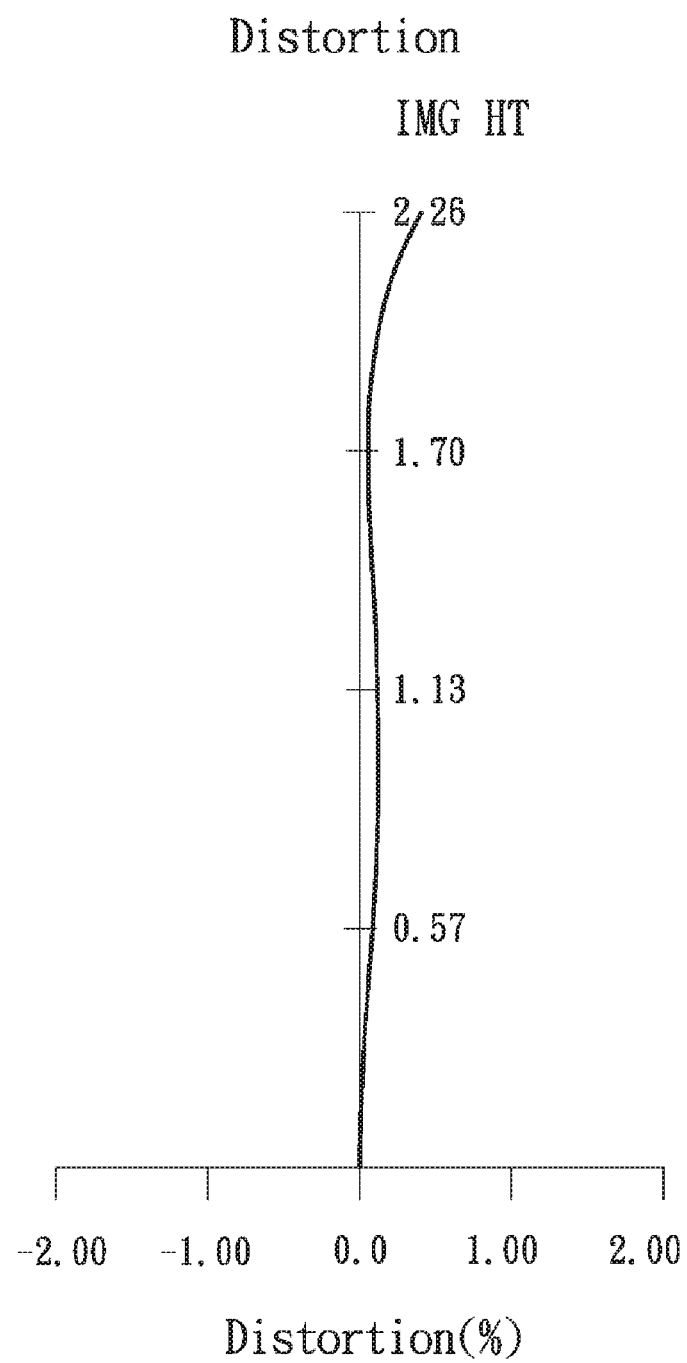
FIG. 2C is a distortion diagram of the lens assembly in accordance with the first embodiment of the invention.

By the above arrangements of the lenses and stop ST1, the lens assembly 1 of the first embodiment can meet the requirements of optical performance as seen in FIGS. 2A-2C, wherein FIG. 2A shows a longitudinal spherical aberration diagram of the lens assembly 1 in accordance with the first embodiment of the invention, FIG. 2B shows an astigmatic field curves diagram of the lens assembly 1 in accordance with the first embodiment of the invention, and FIG. 2C shows a distortion diagram of the lens assembly 1 in accordance with the first embodiment of the invention.

It can be seen from FIG. 2A that the longitudinal spherical aberration in the lens assembly 1 of the first embodiment ranges from −0.005 mm to 0.013 mm for the wavelength of 435.8300 nm, 546.0700 nm, and 656.2800 nm.

It can be seen from FIG. 2B that the astigmatic field curves of tangential direction and sagittal direction in the lens assembly 1 of the first embodiment ranges from −0.005 mm to 0.005 mm for the wavelength of 546.0700 nm.

It can be seen from FIG. 2C that the distortion in the lens assembly 1 of the first embodiment ranges from 0% to 0.5% for the wavelength of 546.0700 nm.

It is obvious that the longitudinal spherical aberration, the astigmatic field curves, and the distortion of the lens assembly 1 of the first embodiment can be corrected effectively. Therefore, the lens assembly 1 of the first embodiment is capable of good optical performance.

Figure 3:
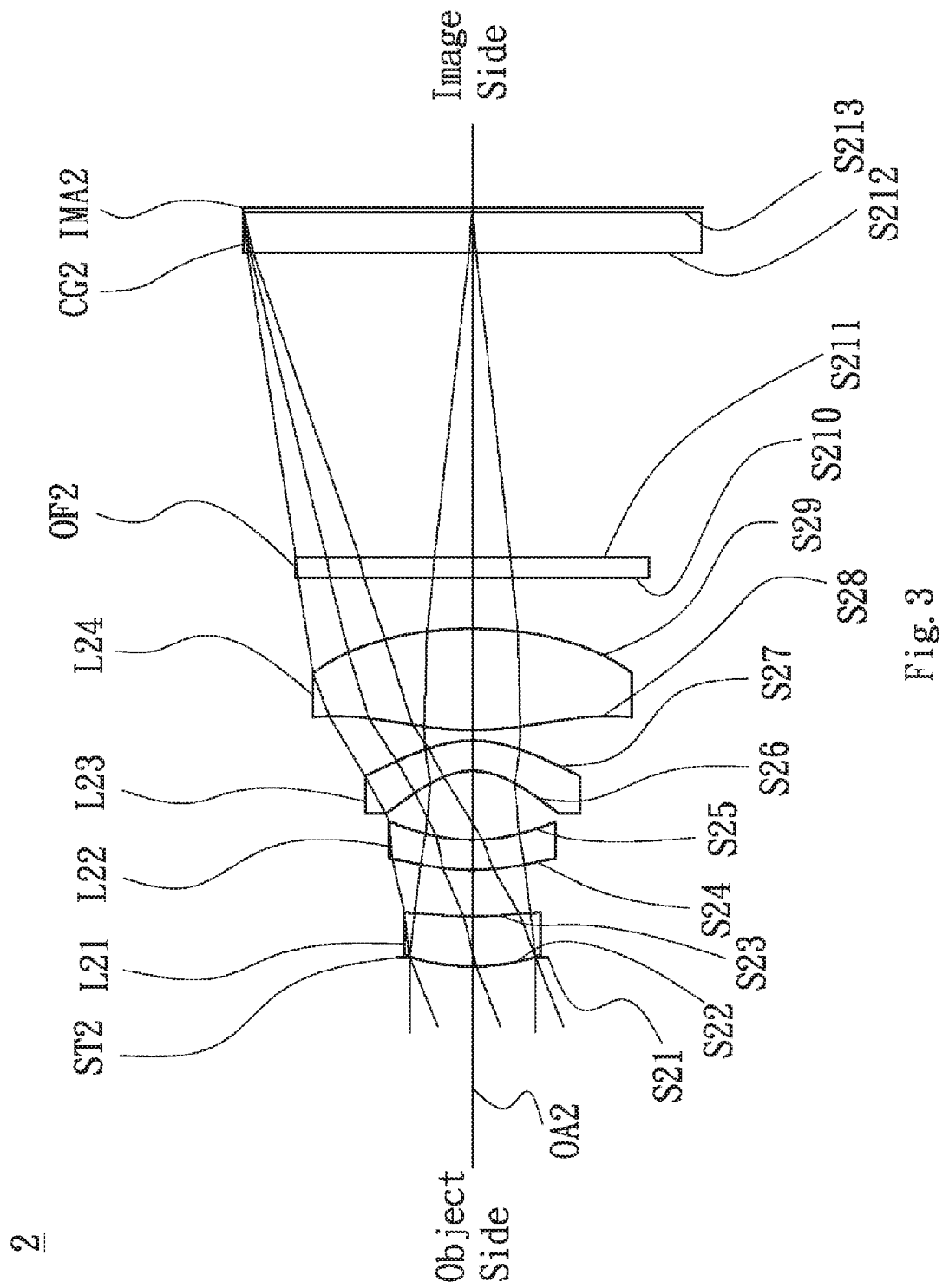
FIG. 3 is a lens layout and optical path diagram of a lens assembly in accordance with a second embodiment of the invention.

Referring to FIG. 3, FIG. 3 is a lens layout and optical path diagram of a lens assembly in accordance with a second embodiment of the invention. The lens assembly 2 includes a stop ST2, a first lens L21, a second lens L22, a third lens L23, a fourth lens L24, an optical filter OF2, and a cover glass CG2, all of which are arranged in order from an object side to an image side along an optical axis OA2. In operation, an image of light rays from the object side is formed at an image plane IMA2.

The first lens L21 is a meniscus lens with positive refractive power and made of glass material, wherein the object side surface S22 is a convex surface, the image side surface S23 is a concave surface, and both of the object side surface S22 and image side surface S23 are aspheric surfaces.

The second lens L22 is a meniscus lens with negative refractive power and made of plastic material, wherein the object side surface S24 is a convex surface, the image side surface S25 is a concave surface, and both of the object side surface S24 and image side surface S25 are aspheric surfaces.

The third lens L23 is a meniscus lens with negative refractive power and made of plastic material, wherein the object side surface S26 is a concave surface, the image side surface S27 is a convex surface, and both of the object side surface S26 and image side surface S27 are aspheric surfaces.

The fourth lens L24 is a biconvex lens with positive refractive power and made of plastic material, wherein the object side surface S28 is a convex surface, the image side surface S29 is a convex surface, and both of the object side surface S28 and image side surface S29 are aspheric surfaces.

Both of the object side surface S210 and image side surface S211 of the optical filter OF2 are plane surfaces.

Both of the object side surface S212 and image side surface S213 of the cover glass CG2 are plane surfaces.

In order to maintain excellent optical performance of the lens assembly in accordance with the second embodiment of the invention, the lens assembly 2 satisfies at least one of the following conditions:

$$FOV2 \leq 56° \quad (8)$$

$$4\ mm < TTL2 - SL2 < 9\ mm \quad (9)$$

$$f2_1 + f2_2 < -1\ mm \quad (10)$$

$$-4 \leq f2_2/f1 \leq 0 \quad (11)$$

$$25 < V2_1 - V2_2 < 38 \quad (12)$$

$$-21.5 \leq (R2_{41} - R2_{42})/(R2_{41} + R2_{42}) \leq 3.5 \quad (13)$$

$$-25\ mm < f2_2 + f2_4 < -1.5\ mm \quad (14)$$

The definition of FOV2, TTL2, SL2, $f2_1$, $f2_2$, $f2_4$, f2, $V2_1$, $V2_2$, $R2_{41}$, and $R2_{42}$ are the same as that of FOV1, TTL1, SL1, $f1_1$, $f1_2$, $f1_4$, f1, $V1_1$, $V1_2$, $R1_{41}$, and $R1_{42}$ in the first embodiment, and is not described here again.

By the above design of the lenses, stop ST2, and satisfies at least one of the conditions (8)-(14), the lens assembly 2 is provided with an effective shortened total lens length, an effective decreased field of view, an increased resolution, and an effective corrected aberration.

In order to achieve the above purposes and effectively enhance the optical performance, the lens assembly 2 in accordance with the second embodiment of the invention is provided with the optical specifications shown in Table 4, which include the effective focal length, F-number, total lens length, field of view, radius of curvature of each lens surface, thickness between adjacent surface, refractive index of each lens, Abbe number of each lens, and effective focal length of each lens. Table 4 shows that the effective focal length is equal to 5.4246 mm, F-number is equal to 4.5, total lens length is equal to 7.412 mm, and field of view is equal to 44.0706 degrees for the lens assembly 2 of the second embodiment of the invention.

TABLE 4

Effective Focal Length = 5.4246 mm F-number = 4.5
Total Lens Length = 7.412 mm Field of View = 44.0706 Degrees

| Surface Number | Radius of Curvature (mm) | Thickness (mm) | Nd | Vd | Effective Focal Length (mm) | Remark |
|---|---|---|---|---|---|---|
| S21 | ∞ | −0.090 | | | | Stop ST2 |
| S22 | 2.066 | 0.500 | 1.589 | 61.2 | 5.59480 | The First Lens L21 |
| S23 | 5.037 | 0.453 | | | | |
| S24 | 2.097 | 0.300 | 1.636 | 23.9 | −19.03600 | The Second Lens L22 |
| S25 | 1.688 | 0.682 | | | | |
| S26 | −0.635 | 0.300 | 1.636 | 23.9 | −3.00140 | The Third Lens L23 |
| S27 | −1.126 | 0.100 | | | | |
| S28 | 2.442 | 1.006 | 1.535 | 55.7 | 2.8826 | The Fourth Lens L24 |
| S29 | −3.585 | 0.500 | | | | |
| S210 | ∞ | 0.210 | 1.517 | 64.2 | | Optical Filter OF2 |
| S211 | ∞ | 3.001 | | | | |
| S212 | ∞ | 0.400 | 1.517 | | | Cover Glass CG2 |
| S213 | ∞ | 0.050 | | | | |

The aspheric surface sag z of each lens in table 4 can be calculated by the following formula:

$$z = ch^2/\{1 + [1-(k+1)c^2h^2]^{1/2}\} + Ah^4 + Bh^6 + Ch^8 + Dh^{10}$$

where c is curvature, h is the vertical distance from the lens surface to the optical axis, k is conic constant and A, B, C and D are aspheric coefficients.

In the second embodiment, the conic constant k and the aspheric coefficients A, B, C, D of each surface are shown in Table 5.

TABLE 5

| Surface Number | S22 | S23 | S24 | S25 |
|---|---|---|---|---|
| K | 3.0921E−03 | 0.0000E+00 | −6.3202E+00 | −1.8255E+00 |
| A | 6.7904E−03 | −2.4248E−02 | −1.2011E−02 | −3.9700E−02 |
| B | −4.9964E−03 | −2.4752E−03 | −3.8126E−02 | 2.6612E−02 |
| C | −1.5750E−04 | −1.6603E−02 | 9.0336E−03 | 2.3417E−03 |
| D | 0.0000E+00 | 0.0000E+00 | −3.5095E−03 | −1.2144E−03 |

| Surface Number | S26 | S27 | S28 | S29 |
|---|---|---|---|---|
| K | −2.1224E+00 | −2.8806E+00 | −2.2729E+01 | 0.0000E+00 |
| A | −5.2106E−02 | 1.4819E−02 | −1.7987E−02 | −8.0327E−02 |
| B | 1.6977E−02 | 7.5686E−03 | 6.6630E−03 | 1.0811E−03 |
| C | 6.4081E−02 | 2.5693E−03 | −2.7596E−03 | −7.5699E−04 |
| D | −1.5156E−02 | −3.5407E−03 | −5.3512E−04 | −7.3260E−05 |

Table 6 shows the parameters and condition values for conditions (8)-(14). As can be seen from Table 6, the lens assembly 2 of the second embodiment satisfies the conditions (8)-(14).

TABLE 6

| FOV2 | 44.0706 Degrees | TTL2 | 7.412 mm | SL2 | 0.09 mm |
|---|---|---|---|---|---|
| f2$_1$ | 5.5948 mm | f2$_2$ | −19.03600 mm | f2$_4$ | 2.8826 mm |
| f2 | 5.4246 mm | V2$_1$ | 61.2 | V2$_2$ | 23.9 |
| R2$_{41}$ | 2.442 mm | R2$_{42}$ | −3.582 mm | | |
| FOV2 | 44.070 Degrees | TTL2 − SL2 | 7.322 mm | f2$_1$ + f2$_2$ | −13.4412 mm |
| f2$_2$ + f2$_4$ | −16.153 mm | f2$_2$/f2 | −3.509 | V2$_1$ − V2$_2$ | 37.3 |
| (R2$_{41}$ − R2$_{42}$)/(R2$_{41}$ + R2$_{42}$) | −5.274 | | | | |

Figure 4A:
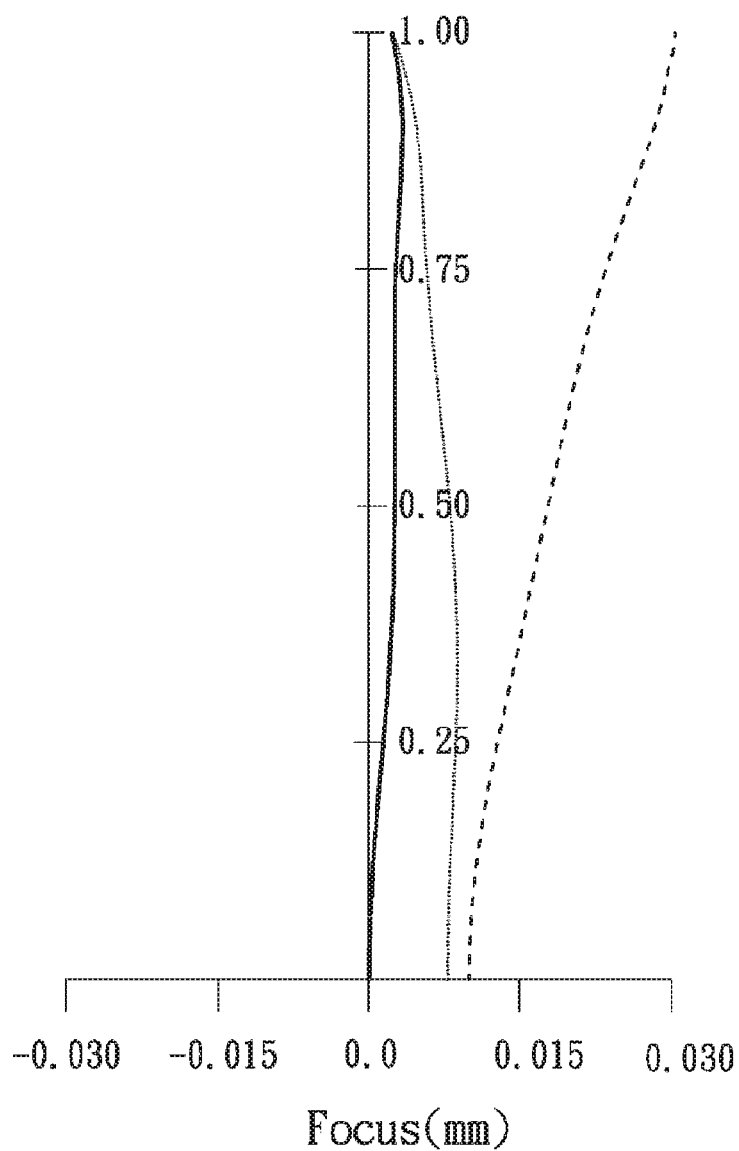
FIG. 4A depicts a longitudinal spherical aberration of the lens assembly in accordance with the second embodiment of the invention.
Figure 4B:
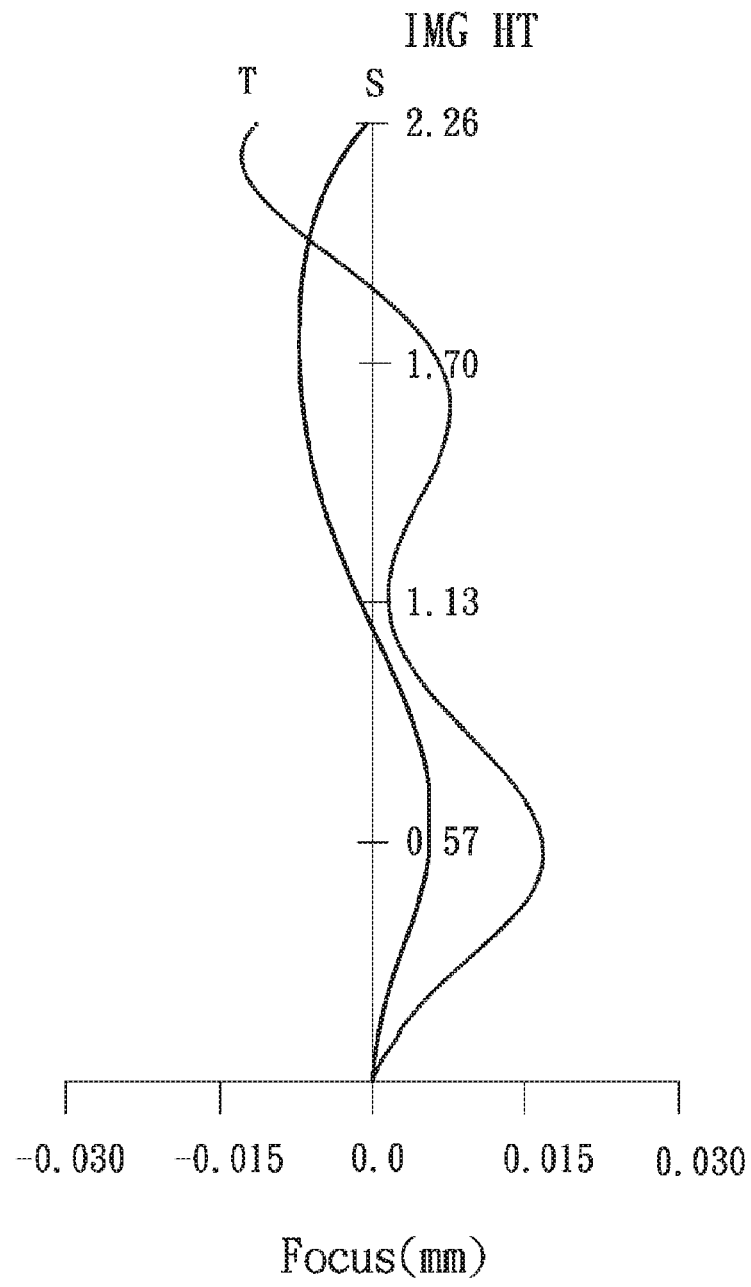
FIG. 4B is an astigmatic field curves diagram of the lens assembly in accordance with the second embodiment of the invention.
Figure 4C:
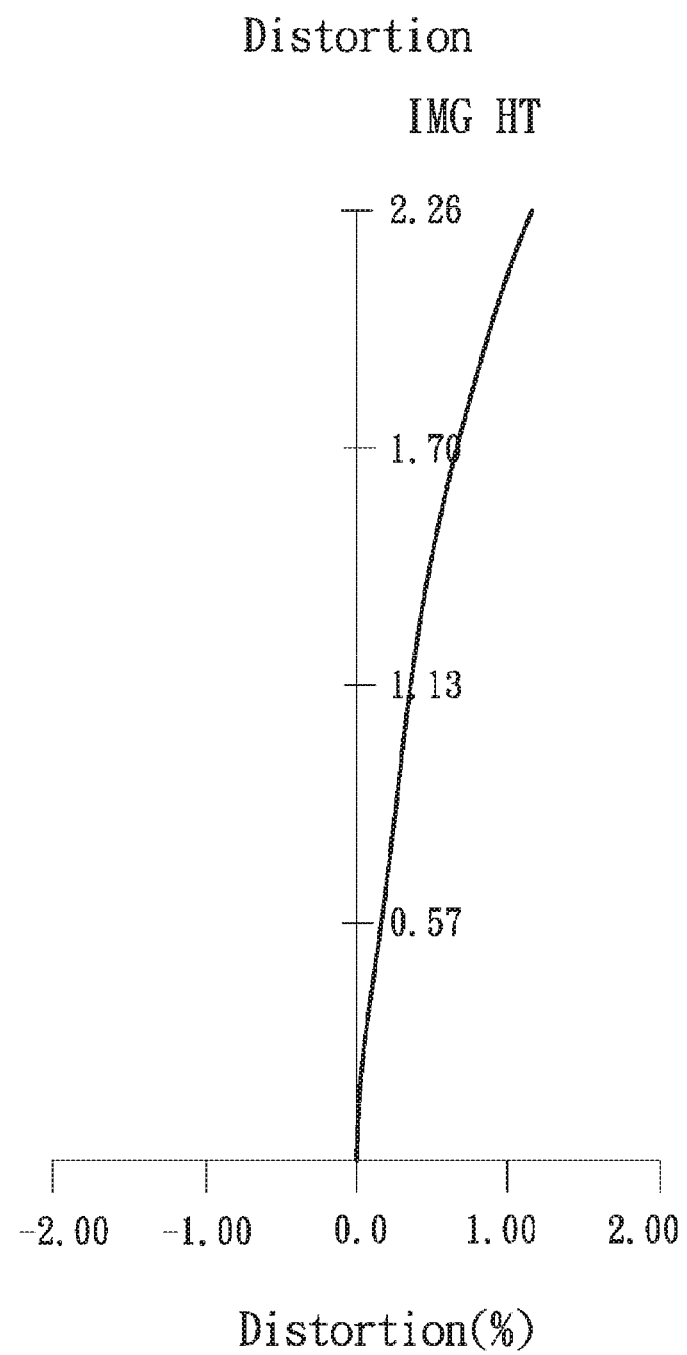
FIG. 4C is a distortion diagram of the lens assembly in accordance with the second embodiment of the invention.

By the above arrangements of the lenses and stop ST2, the lens assembly 2 of the second embodiment can meet the requirements of optical performance as seen in FIGS. 4A-4C, wherein FIG. 4A shows a longitudinal spherical aberration diagram of the lens assembly 2 in accordance with the second embodiment of the invention, FIG. 4B shows an astigmatic field curves diagram of the lens assembly 2 in accordance with the second embodiment of the invention, and FIG. 4C shows a distortion diagram of the lens assembly 2 in accordance with the second embodiment of the invention.

It can be seen from FIG. 4A that the longitudinal spherical aberration in the lens assembly 2 of the second embodiment ranges from 0.00 mm to 0.030 mm for the wavelength of 435.8300 nm, 546.0700 nm, and 656.2800 nm.

It can be seen from FIG. 4B that the astigmatic field curves of tangential direction and sagittal direction in the lens assembly 2 of the second embodiment ranges from −0.015 mm to 0.018 mm for the wavelength of 546.0700 nm.

It can be seen from FIG. 4C that the distortion in the lens assembly 2 of the second embodiment ranges from 0% to 1.3% for the wavelength of 546.0700 nm.

It is obvious that the longitudinal spherical aberration, the astigmatic field curves, and the distortion of the lens assembly 2 of the second embodiment can be corrected effectively. Therefore, the lens assembly 2 of the second embodiment is capable of good optical performance.

Figure 5:
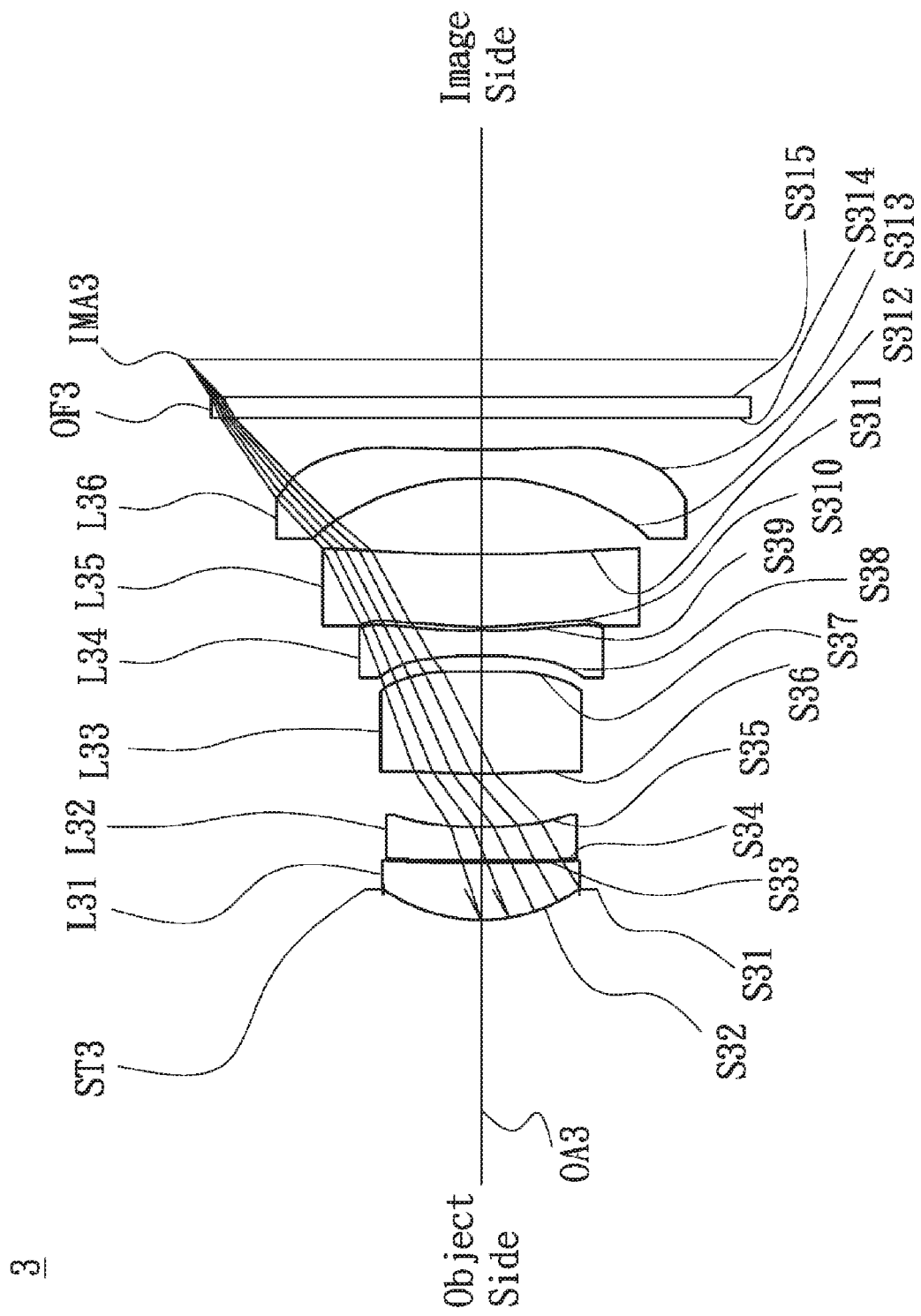
FIG. 5 is a lens layout and optical path diagram of a lens assembly in accordance with a third embodiment of the invention.

Referring to FIG. 5, FIG. 5 is a lens layout and optical path diagram of a lens assembly in accordance with a third embodiment of the invention. The lens assembly 3 includes a stop ST3, a first lens L31, a second lens L32, a third lens L33, a fourth lens L34, a fifth lens L35, a sixth lens L36, and an optical filter OF3, all of which are arranged in order from an object side to an image side along an optical axis OA3. In operation, an image of light rays from the object side is formed at an image plane IMA3.

The first lens L31 is a meniscus lens with positive refractive power and made of plastic material, wherein the object side surface S32 is a convex surface, the image side surface S33 is a concave surface, and both of the object side surface S32 and image side surface S33 are aspheric surfaces.

The second lens L32 is a biconcave lens with negative refractive power and made of plastic material, wherein the object side surface S34 is a concave surface, the image side surface S35 is a concave surface, and both of the object side surface S34 and image side surface S35 are aspheric surfaces.

The third lens L33 is a biconvex lens with positive refractive power and made of plastic material, wherein the object side surface S36 is a convex surface, the image side surface S37 is a convex surface, and both of the object side surface S36 and image side surface S37 are aspheric surfaces.

The fourth lens L34 is a biconcave lens with negative refractive power and made of plastic material, wherein the object side surface S38 is a concave surface, the image side surface S39 is a concave surface, and both of the object side surface S38 and image side surface S39 are aspheric surfaces.

The fifth lens L35 is a biconvex lens with positive refractive power and made of plastic material, wherein the object side surface S310 is a convex surface, the image side surface S311 is a convex surface, and both of the object side surface S310 and image side surface S311 are aspheric surfaces.

The sixth lens L36 is a biconcave lens with negative refractive power and made of plastic material, wherein the object side surface S312 is a concave surface, the image side surface S313 is a concave surface, and both of the object side surface S312 and image side surface S313 are aspheric surfaces Both of the object side surface S314 and image side surface S315 of the optical filter OF3 are plane surfaces.

which include the effective focal length, F-number, total lens length, field of view, radius of curvature of each lens surface, thickness between adjacent surface, refractive index of each lens, Abbe number of each lens, and effective focal length of each lens. Table 7 shows that the effective focal length is equal to 5.574 mm, F-number is equal to 2.8, total lens length is equal to 5.88 mm, and field of view is equal to 55.5 degrees for the lens assembly 3 of the third embodiment of the invention.

TABLE 7

Effective Focal Length = 5.574 mm F-number = 2.8
Total Lens Length = 5.88 mm Field of View = 55.5 Degrees

| Surface Number | Radius of Curvature (mm) | Thickness (mm) | Nd | Vd | Effective Focal Length (mm) | Remark |
|---|---|---|---|---|---|---|
| S31 | ∞ | −0.316 | | | | Stop ST3 |
| S32 | 1.7608 | 0.591 | 1.535 | 56.115 | 3.423 | The First Lens L31 |
| S33 | 38.585 | 0.026 | | | | |
| S34 | −2512.54 | 0.35 | 1.636 | 23.972 | −6.364 | The Second Lens L32 |
| S35 | 4.064 | 0.6 | | | | |
| S36 | 8.398 | 1.083 | 1.535 | 56.115 | 7.624 | The Third Lens L33 |
| S37 | −7.599 | 0.159 | | | | |
| S38 | −5.616 | 0.266 | 1.544 | 56.093 | −5.354 | The Fourth Lens L34 |
| S39 | 6.171 | 0.031 | | | | |
| S310 | 4.21 | 0.777 | 1.535 | 56.115 | 6.588 | The Fifth Lens L35 |
| S311 | −20.468 | 0.791 | | | | |
| S312 | −3.319 | 0.295 | 1.535 | 56.115 | −3.847 | The Sixth Lens L36 |
| S313 | 5.609 | 0.345 | | | | |
| S314 | ∞ | 0.21 | 1.517 | 64.167 | | Optical Filter OF3 |
| S315 | ∞ | 0.396 | | | | |

In order to maintain excellent optical performance of the lens assembly in accordance with the third embodiment of the invention, the lens assembly 3 satisfies at least one of the following conditions:

$FOV3 \leq 56°$ (15)

$4 \text{ mm} < TTL3 - SL3 < 9 \text{ mm}$ (16)

$f3_1 + f3_2 < -1 \text{ mm}$ (17)

$-25 \text{ mm} \leq f3_2 + f3_4 < -1.5 \text{ mm}$ (18)

$-4 \leq f3_2/f3 \leq 0$ (19)

$2 \text{ mm} < f3_5 + f3_6 < 35 \text{ mm}$ (20)

$25 < V3_1 - V3_2 < 38$ (21)

$-21.5 \leq (R3_{41} - R3_{42})/(R3_{41} + R3_{42}) \leq 3.5$ (22)

The definition of FOV3, TTL3, SL3, f3$_1$, f3$_2$, f3$_4$, f3, V3$_1$, V3$_2$, R3$_{41}$, and R3$_{42}$ are the same as that of FOV1, TTL1, SL1, f1$_1$, f1$_2$, f1$_4$, f1, V1$_1$, V1$_2$, R1$_{41}$, and R1$_{42}$ in the first embodiment, and is not described here again, f3$_5$ is an effective focal length of the fifth lens L35 and f3$_6$ is an effective focal length of the sixth lens L36.

By the above design of the lenses, stop ST3, and satisfies at least one of the conditions (15)-(22), the lens assembly 3 is provided with an effective shortened total lens length, an effective decreased field of view, an increased resolution, and an effective corrected aberration.

In order to achieve the above purposes and effectively enhance the optical performance, the lens assembly 3 in accordance with the third embodiment of the invention is provided with the optical specifications shown in Table 7, The aspheric surface sag z of each lens in table 7 can be calculated by the following formula:

$$z = ch^2 / \{1 + [1 - (k+1)c^2h^2]^{1/2}\} + Ah^4 + Bh^6 + Ch^8 + Dh^{10} + Eh^{12} + Fh^{14} + Gh^{16}$$

where c is curvature, h is the vertical distance from the lens surface to the optical axis, k is conic constant and A, B, C, D, E, F and G are aspheric coefficients.

In the third embodiment, the conic constant k and the aspheric coefficients A, B, C, D, E, F, G of each surface are shown in Table 8.

TABLE 8

| Surface Number | k<br>D | A<br>E | B<br>F | C<br>G |
|---|---|---|---|---|
| S32 | 0.024<br>−4.32E−03 | 8.24E−03<br>−4.69E−04 | −4.99E−03<br>−2.01E−03 | 8.59E−03<br>−1.12E−03 |
| S33 | 0<br>1.05E−02 | −8.55E−03<br>−1.84E−04 | 8.54E−03<br>−2.31E−03 | 8.86E−03<br>−1.12E−02 |
| S34 | 0<br>1.46E−02 | −2.40E−02<br>−8.56E−03 | 2.59E−02<br>−5.08E−03 | 2.08E−02<br>−1.09E−03 |
| S35 | −1.101<br>3.23E−02 | −9.52E−03<br>−1.01E−02 | 5.91E−02<br>−2.66E−02 | −7.41E−03<br>3.80E−02 |
| S36 | 3.316<br>1.08E−02 | −3.62E−02<br>−5.64E−03 | −1.80E−02<br>−1.37E−02 | 7.05E−03<br>7.73E−03 |
| S37 | 0<br>−7.59E−03 | −1.12E−01<br>8.03E−03 | 1.07E−02<br>7.83E−03 | −2.49E−02<br>−6.23E−03 |
| S38 | 0<br>−5.81E−03 | −5.86E−02<br>−3.53E−03 | −2.50E−02<br>−1.59E−03 | −9.50E−03<br>1.41E−03 |
| S39 | −0.904<br>−2.64E−03 | −3.41E−02<br>−1.61E−03 | 1.26E−02<br>−6.45E−04 | 1.38E−03<br>−2.98E−04 |
| S310 | 4.469<br>1.03E−03 | −6.85E−02<br>8.80E−04 | 1.93E−02<br>−3.64E−04 | −1.29E−02<br>−1.23E−08 |
| S311 | −1002.23<br>−5.00E−04 | 3.17E−02<br>4.84E−05 | 6.87E−04<br>1.45E−04 | −3.47E−03<br>−2.39E−05 |

TABLE 8-continued

| Surface Number | k D | A E | B F | C G |
|---|---|---|---|---|
| S312 | 1.759 −7.83E−04 | −3.46E−02 −7.24E−04 | 4.98E−04 −4.02E−05 | 9.89E−03 4.00E−05 |
| S313 | −10.386 2.26E−04 | −6.64E−02 −1.74E−05 | 1.42E−02 −5.58E−06 | −2.36E−03 4.41E−07 |

Table 9 shows the parameters and condition values for conditions (15)-(22). As can be seen from Table 8, the lens assembly 3 of the third embodiment satisfies the conditions (15)-(22).

TABLE 9

| FOV3 | 55.5 Degrees | TTL3 | 5.88 mm | SL3 | 0.316 mm |
|---|---|---|---|---|---|
| $f3_1$ | 3.42 mm | $f3_2$ | −6.364 mm | $f3_4$ | −5.354 mm |
| $f3_5$ | 6.588 mm | $f3_6$ | −3.847 mm | $f3$ | 5.574 mm |
| $V3_1$ | 56.115 | $V3_2$ | 23.972 | $R3_{41}$ | −5.616 mm |
| $R3_{42}$ | 6.171 mm | | | | |
| FOV3 | 55.5 Degrees | TTL3 − SL3 | 5.564 mm | $f3_1 + f3_2$ | −2.941 mm |
| $f3_2 + f3_4$ | −11.718 mm | $f3_2/f3$ | −1.142 | $f3_5 + f3_6$ | 2.741 mm |
| $V3_1 − V3_2$ | 32.143 | $(R3_{41} − R3_{42})/(R3_{41} + R3_{42})$ | −21.238 | | |

Figure 6A:
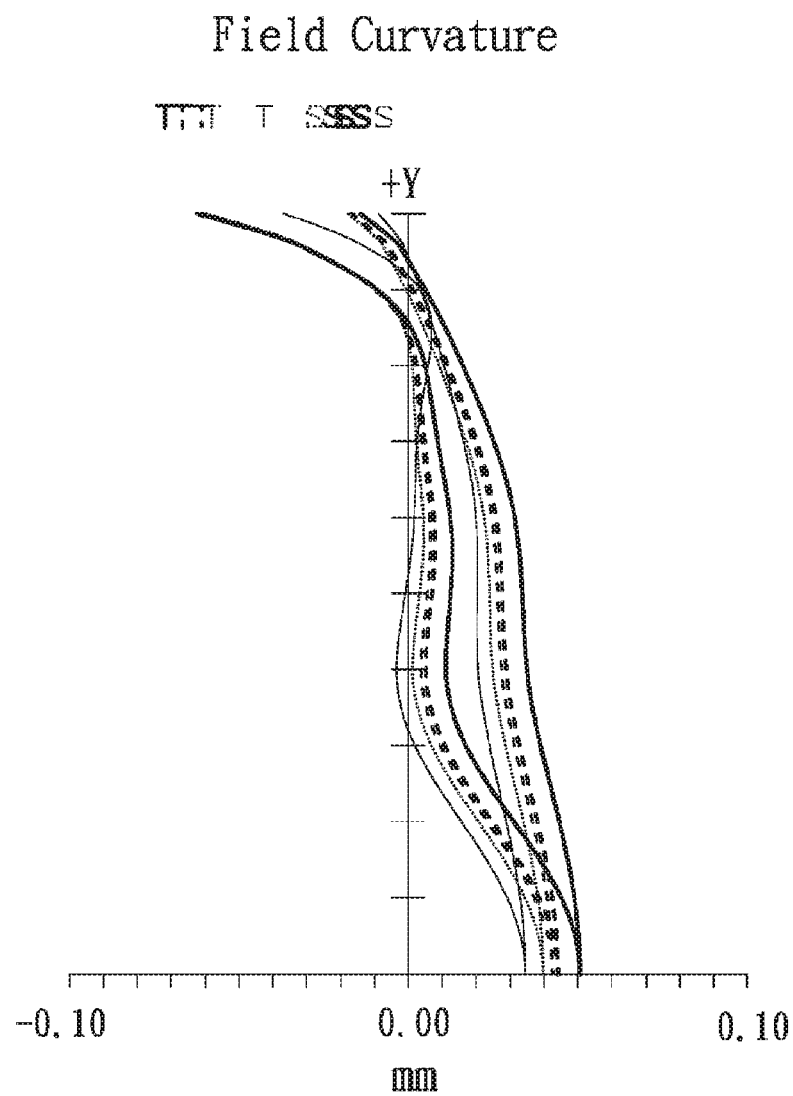
FIG. 6A depicts a field curvature diagram of the lens assembly in accordance with the third embodiment of the invention.
Figure 6B:
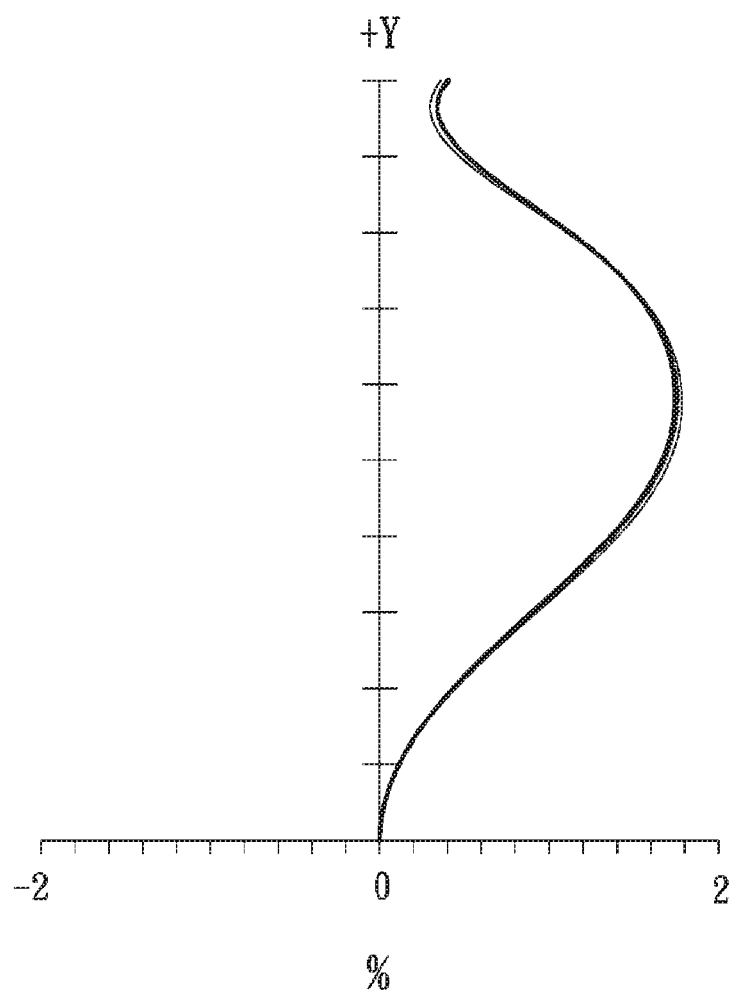
FIG. 6B is a distortion diagram of the lens assembly in accordance with the third embodiment of the invention.
Figure 6C:
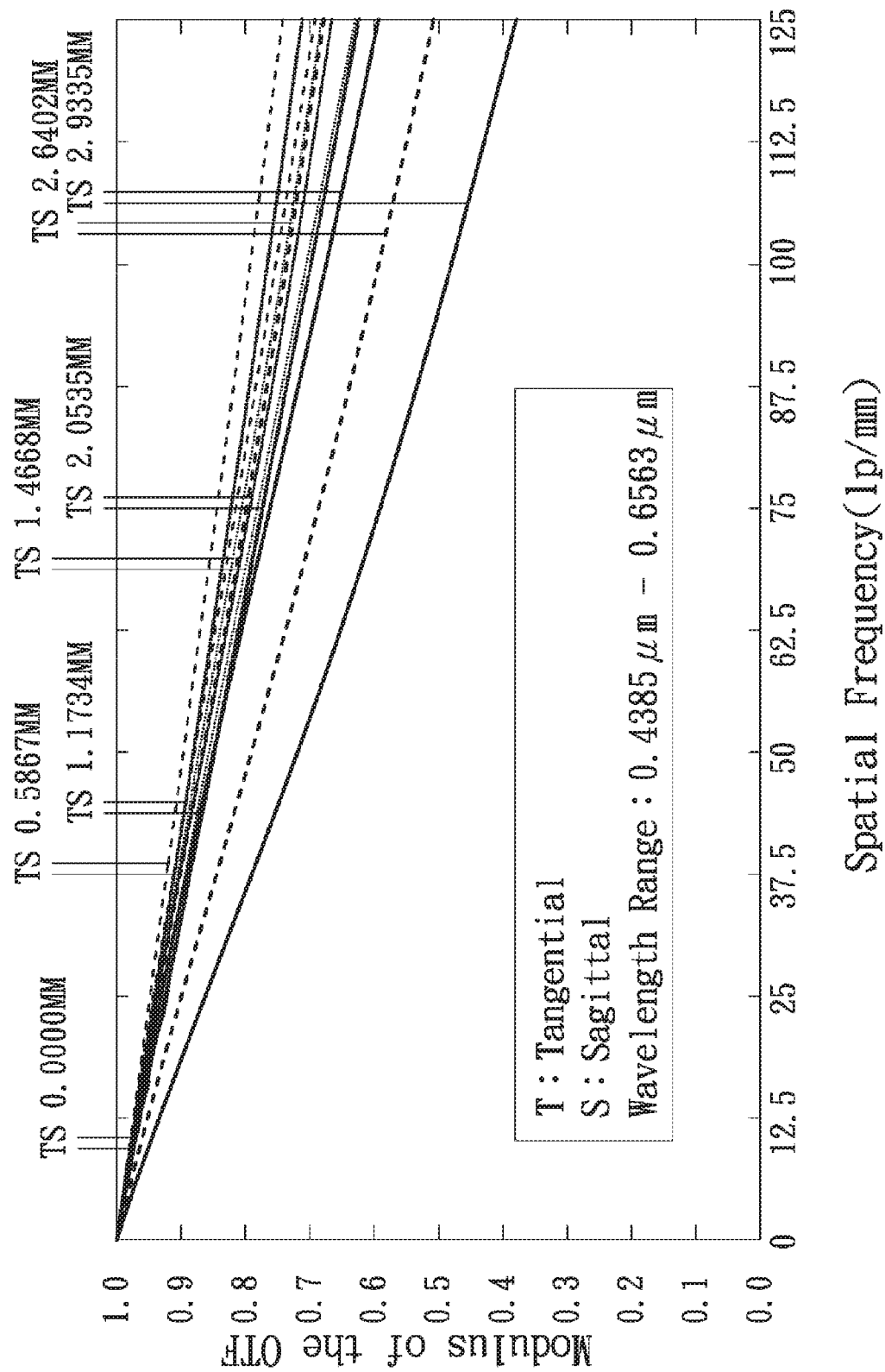
FIG. 6C is a modulation transfer function diagram of the lens assembly in accordance with the third embodiment of the invention.

By the above arrangements of the lenses and stop ST3, the lens assembly 3 of the third embodiment can meet the requirements of optical performance as seen in FIGS. 6A-6C, wherein FIG. 6A shows a field curvature diagram of the lens assembly 3 in accordance with the third embodiment of the invention, FIG. 6B shows a distortion diagram of the lens assembly 3 in accordance with the third embodiment of the invention, and FIG. 6C shows a modulation transfer function diagram of the lens assembly 3 in accordance with the third embodiment of the invention.

It can be seen from FIG. 6A that the field curvature of tangential direction and sagittal direction in the lens assembly 3 of the third embodiment ranges from −0.06 mm to 0.05 mm for the wavelength of 0.439 μm, 0.546 μm, 0.573 μm, 0.587 μm, and 0.656 μm.

It can be seen from FIG. 6B that the distortion in the lens assembly 3 of the third embodiment ranges from 0% to 1.8% for the wavelength of 0.439 μm, 0.546 μm, 0.573 μm, 0.587 μm, and 0.656 μm.

It can be seen from FIG. 6C that the modulation transfer function of tangential direction and sagittal direction in the lens assembly 3 of the third embodiment ranges from 0.38 to 1.0 wherein the wavelength ranges from 0.4385 μm to 0.6563 μm, the fields respectively are 0.0000 mm, 0.5867 mm, 1.1734 mm, 1.4668 mm, 2.0535 mm, 2.6402 mm, and 2.9335 mm, and the spatial frequency ranges from 0 lp/mm to 125 lp/mm.

It is obvious that the field curvature and the distortion of the lens assembly 3 of the third embodiment can be corrected effectively, and the resolution of the lens assembly 3 of the third embodiment can meet the requirement. Therefore, the lens assembly 3 of the third embodiment is capable of good optical performance.

Figure 7:
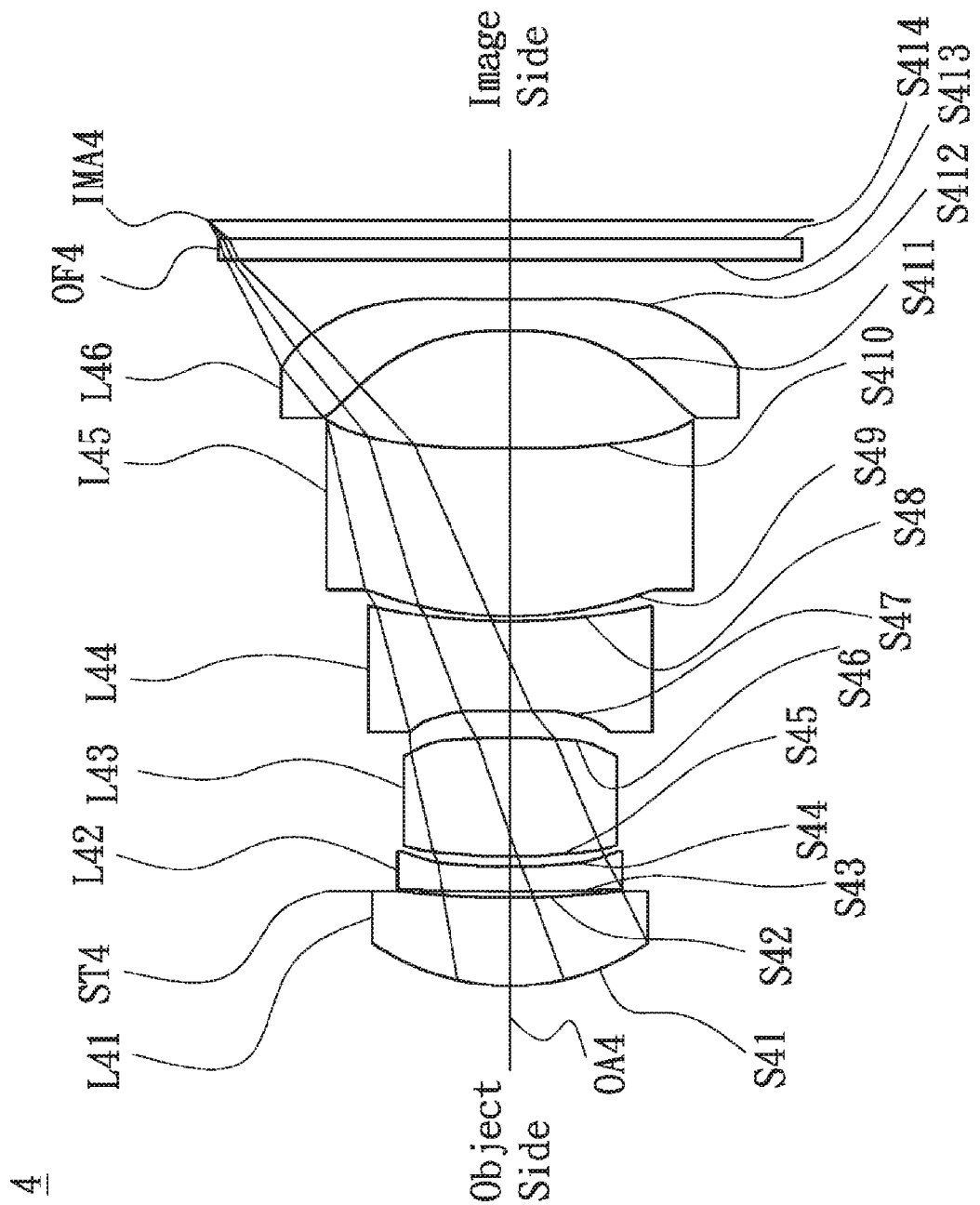
FIG. 7 is a lens layout and optical path diagram of a lens assembly in accordance with a fourth embodiment of the invention.

Referring to FIG. 7, FIG. 7 is a lens layout and optical path diagram of a lens assembly in accordance with a fourth embodiment of the invention. The lens assembly 4 includes a first lens L41, a stop ST4, a second lens L42, a third lens L43, a fourth lens L44, a fifth lens L45, a sixth lens L46, and an optical filter OF4, all of which are arranged in order from an object side to an image side along an optical axis OA4. In operation, an image of light rays from the object side is formed at an image plane IMA4.

The first lens L41 is a meniscus lens with positive refractive power and made of plastic material, wherein the object side surface S41 is a convex surface, the image side surface S42 is a concave surface, and both of the object side surface S41 and image side surface S42 are aspheric surfaces.

The second lens L42 is a biconcave lens with negative refractive power and made of plastic material, wherein the object side surface S43 is a concave surface, the image side surface S44 is a concave surface, and both of the object side surface S43 and image side surface S44 are aspheric surfaces.

The third lens L43 is a biconvex lens with positive refractive power and made of plastic material, wherein the object side surface S45 is a convex surface, the image side surface S46 is a convex surface, and both of the object side surface S45 and image side surface S46 are aspheric surfaces.

The fourth lens L44 is a biconcave lens with negative refractive power and made of plastic material, wherein the object side surface S47 is a concave surface, the image side surface S48 is a concave surface, and both of the object side surface S47 and image side surface S48 are aspheric surfaces.

The fifth lens L45 is a meniscus lens with positive refractive power and made of plastic material, wherein the object side surface S49 is a convex surface, the image side surface S410 is a concave surface, and both of the object side surface S49 and image side surface S410 are aspheric surfaces.

The sixth lens L46 is a biconcave lens with negative refractive power and made of plastic material, wherein the object side surface S411 is a concave surface, the image side surface S412 is a concave surface, and both of the object side surface S411 and image side surface S412 are aspheric surfaces Both of the object side surface S413 and image side surface S414 of the optical filter OF4 are plane surfaces.

In order to maintain excellent optical performance of the lens assembly in accordance with the fourth embodiment of the invention, the lens assembly 4 satisfies at least one of the following conditions:

$$FOV4 \leq 56° \tag{23}$$

$$4 \text{ mm} < TTL4-SL4 < 9 \text{ mm} \tag{24}$$

$$f4_1+f4_2<-1 \text{ mm} \tag{25}$$

$$-25 \text{ mm} < f4_2+f4_4 < -1.5 \text{ mm} \tag{26}$$

$$-4 \leq f4_2/f4 \leq 0 \tag{27}$$

$$2 \text{ mm} < f4_5+f4_6 < 35 \text{ mm} \tag{28}$$

$$25 < V4_1-V4_2 < 38 \tag{29}$$

$$-21.5 \leq (R4_{41}-R4_{42})/(R4_{41}+R4_{42}) \leq 3.5 \tag{30}$$

The definition of FOV4, TTL4, SL4, $f4_1$, $f4_2$, $f4_4$, $f4_5$, $f4_6$, f4, $V4_1$, $V4_2$, $R4_{41}$, and $R4_{42}$ are the same as that of FOV3, TTL3, SL3, $f3_1$, $f3_2$, $f3_4$, $f3_5$, $f3_6$, f3, $V3_1$, $V3_2$, $R3_{41}$, and $R3_{42}$ in the third embodiment, and is not described here again.

By the above design of the lenses, stop ST4, and satisfies at least one of the conditions (23)-(30), the lens assembly 4 is provided with an effective shortened total lens length, an effective decreased field of view, an increased resolution, and an effective corrected aberration.

In order to achieve the above purposes and effectively enhance the optical performance, the lens assembly 4 in accordance with the fourth embodiment of the invention is provided with the optical specifications shown in Table 10, which include the effective focal length, F-number, total lens length, field of view, radius of curvature of each lens surface, thickness between adjacent surface, refractive index of each lens, Abbe number of each lens, and effective focal length of each lens. Table 10 shows that the effective focal length is equal to 7.082 mm, F-number is equal to 2.8, total lens length is equal to 7.7 mm, and field of view is equal to 45 degrees for the lens assembly 4 of the fourth embodiment of the invention.

TABLE 10

Effective Focal Length = 7.082 mm F-number = 2.8
Total Lens Length = 7.7 mm Field of View = 45 Degrees

| Surface Number | Radius of Curvature (ram) | Thickness (mm) | Nd | Vd | Effective Focal Length (mm) | Remark |
|---|---|---|---|---|---|---|
| S41 | 2.347197 | 0.910177 | 1.535 | 56.115 | 4.547 | The First Lens L41 |
| S42 | 54.93809 | 0.046326 | | | | Stop ST4 |
| S43 | −20.1212 | 0.249992 | 1.636 | 23.972 | −7.392 | The Second Lens L42 |
| S44 | 6.184075 | 0.108445 | | | | |
| S45 | 7.374668 | 1.184192 | 1.535 | 56.115 | 9.335 | The Third Lens L43 |
| S46 | −14.6877 | 0.274388 | | | | |
| S47 | −11.0451 | 0.913223 | 1.544 | 56.093 | −6.845 | The Fourth Lens L44 |
| S48 | 5.799714 | 0.02497 | | | | |
| S49 | 4.304854 | 1.69802 | 1.535 | 56.115 | 9.369 | The Fifth Lens L45 |
| S410 | 26.00662 | 1.176473 | | | | |
| S411 | −3.46793 | 0.309922 | 1.535 | 56.115 | −4.533 | The Sixth Lens L46 |
| S412 | 8.369748 | 0.4 | | | | |
| S413 | ∞ | 0.21 | 1.517 | 64.167 | | Optical Filter OF4 |
| S414 | ∞ | 0.195235 | | | | |

The aspheric surface sag z of each lens in table 10 can be calculated by the following formula:

$$z = ch^2/\{1+[1-(k+1)c^2h^2]^{1/2}\} + Ah^4 + Bh^b + Ch^8 + Dh^{10} + Eh^{12} + Fh^{14} + Gh^{16}$$

where c is curvature, h is the vertical distance from the lens surface to the optical axis k is conic constant and A, B, C, D, E, F and are aspheric coefficients.

In the fourth embodiment, the conic constant k and the aspheric coefficients A, B, C, D, E, F, G of each surface are shown in Table 11.

TABLE 11

| Surface Number | k<br>D | A<br>E | B<br>F | C<br>G |
|---|---|---|---|---|
| S41 | 0.024<br>−3.55E−03 | 1.76E−03<br>−1.46E−03 | −3.29E−03<br>1.76E−03 | 5.27E−03<br>−4.44E−04 |
| S42 | 0<br>6.44E−03 | 2.24E−02<br>1.79E−04 | 4.43E−03<br>−3.88E−03 | −4.83E−03<br>2.56E−04 |
| S43 | 0<br>−2.62E−03 | 9.51E−03<br>−4.35E−03 | 1.78E−02<br>1.77E−03 | 1.17E−02<br>−1.16E−03 |
| S44 | −1.101<br>1.29E−02 | −1.02E−02<br>−5.04E−03 | 5.70E−02<br>−1.22E−02 | −1.67E−03<br>5.30E−03 |
| S45 | 3.316<br>−1.14E−02 | −1.12E−02<br>−9.35E−03 | 1.43E−02<br>4.35E−03 | 2.27E−02<br>−2.56E−03 |
| S46 | 0<br>−2.41E−03 | −1.14E−01<br>−1.00E−03 | 4.02E−03<br>5.70E−03 | −3.38E−03<br>−3.28E−03 |
| S47 | 0<br>−4.85E−03 | −1.66E−01<br>−1.50E−02 | −1.16E−02<br>9.61E−03 | 3.32E−02<br>−4.51E−04 |
| S48 | −0.904<br>−4.93E−03 | −3.12E−02<br>−8.00E−04 | 2.29E−02<br>1.21E−03 | 1.67E−03<br>−1.43E−04 |
| S49 | 4.469<br>−7.58E−04 | 1.05E−02<br>8.69E−05 | 1.80E−03<br>3.40E−04 | −4.87E−03<br>−9.80E−05 |
| S410 | −1002.23<br>−3.52E−04 | 2.79E−02<br>−6.09E−05 | −4.18E−03<br>2.60E−05 | 1.76E−03<br>−1.55E−06 |
| S411 | 1.759<br>−1.07E−03 | −7.58E−02<br>−9.58E−05 | 2.53E−02<br>2.59E−05 | −3.34E−04<br>1.15E−05 |

TABLE 11-continued

| Surface Number | k<br>D | A<br>E | B<br>F | C<br>G |
|---|---|---|---|---|
| S412 | −10.386<br>−2.72E−04 | −5.33E−02<br>3.17E−07 | 1.12E−02<br>7.68E−06 | −4.96E−04<br>−5.92E−07 |

Table 12 shows the parameters and condition values for conditions (23)-(30). As can be seen from Table 12, the lens assembly 4 of the fourth embodiment satisfies the conditions (23)-(30).

TABLE 12

| FOV4 | 45 Degrees | TTL4 | 7.7 mm | SL4 | 0.910 mm |
|---|---|---|---|---|---|
| $f4_1$ | 4.547 mm | $f4_2$ | −7.392 mm | $f4_4$ | −6.845 mm |
| $f4_5$ | 9.369 mm | $f4_6$ | −4.533 mm | f4 | 7.082 mm |
| $V4_1$ | 56.115 | $V4_2$ | 23.972 | $R4_{41}$ | −11.0451 mm |
| $R4_{42}$ | 5.799714 mm | | | | |
| FOV4 | 45 Degrees | TTL4 − SL4 | 6.79 mm | $f4_1 + f4_2$ | −2.845 mm |
| $f4_2 + f4_4$ | −14.237 mm | $f4_2/f4$ | −1.044 | $f4_5 + f4_6$ | 4.836 mm |
| $V4_1 − V4_2$ | 32.143 | $(R4_{41} − R4_{42})/(R4_{41} + R4_{42})$ | 3.211 | | |

Figure 8A:
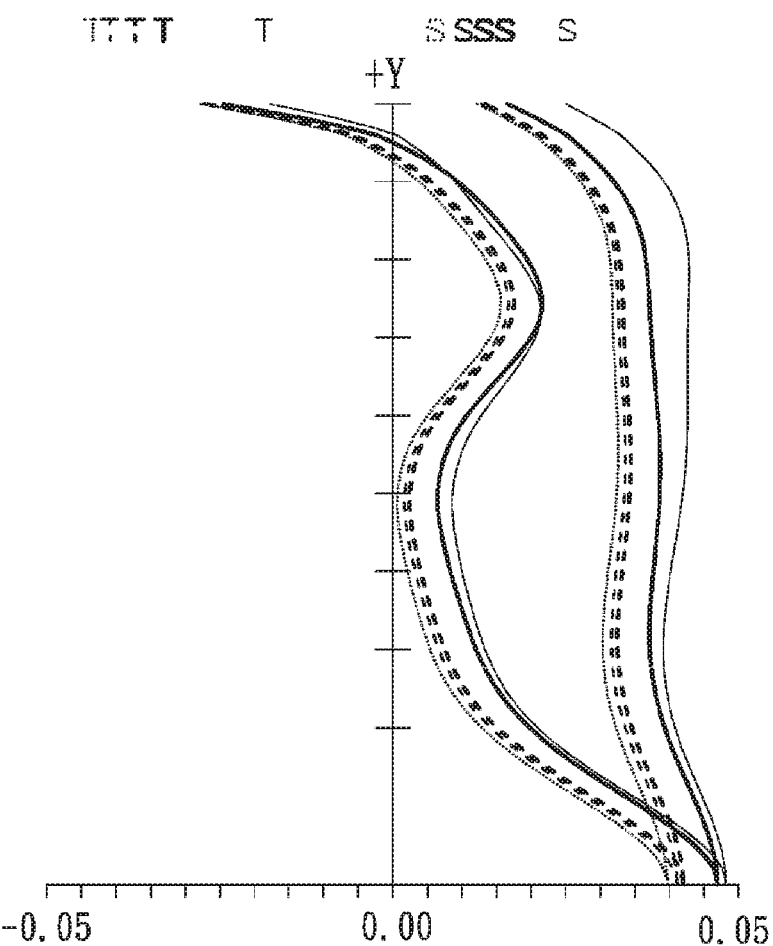
FIG. 8A depicts a field curvature diagram of the lens assembly in accordance with the fourth embodiment of the invention.
Figure 8B:
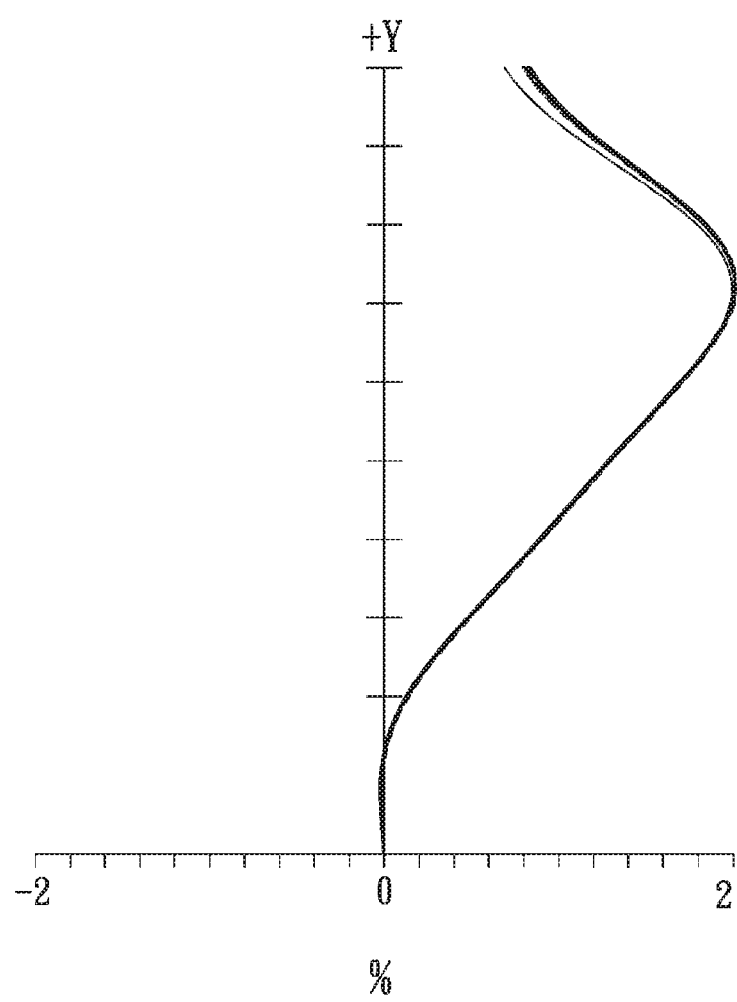
FIG. 8B is a distortion diagram of the lens assembly in accordance with the fourth embodiment of the invention.
Figure 8C:
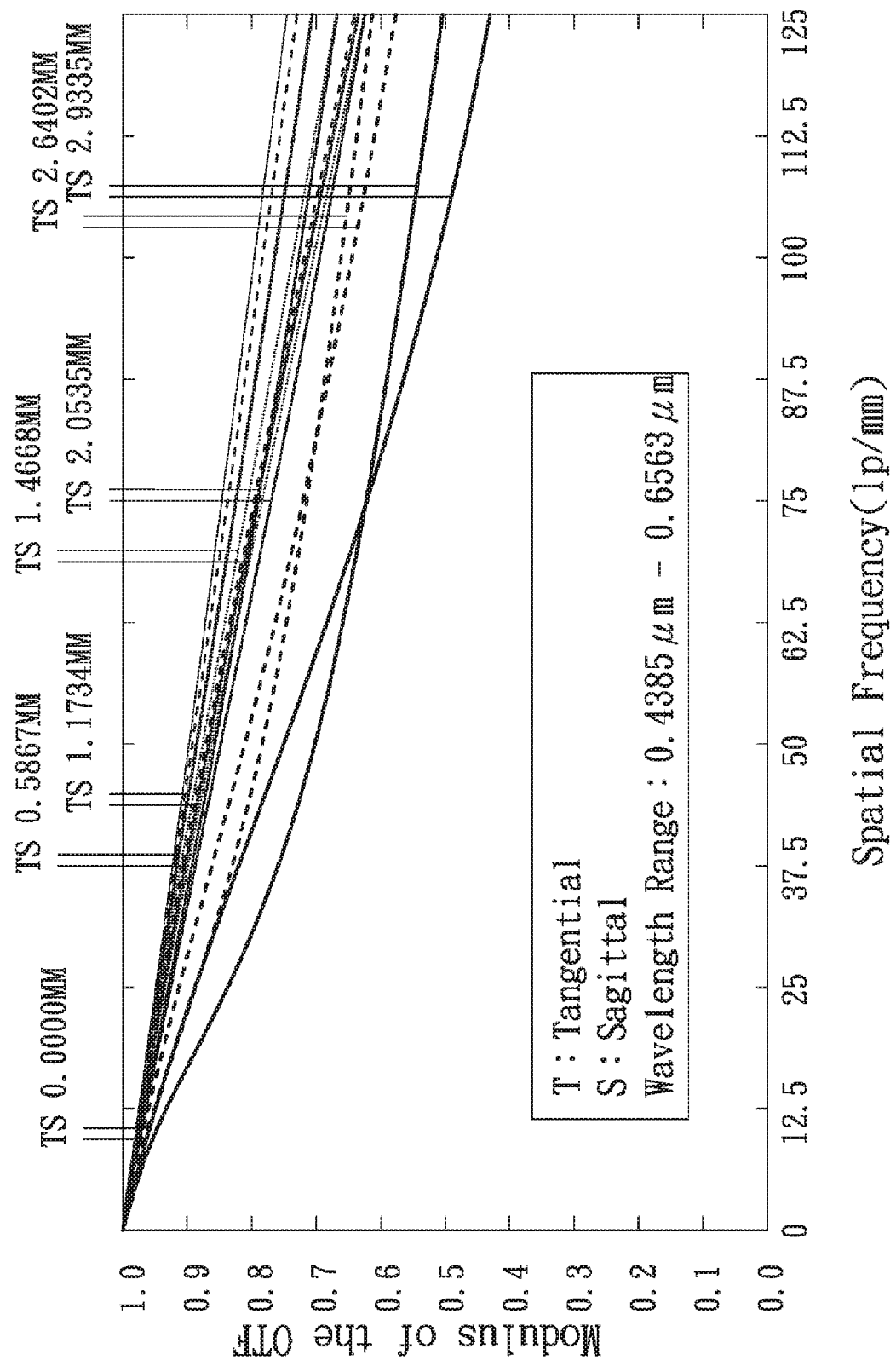
FIG. 8C is a modulation transfer function diagram of the lens assembly in accordance with the fourth embodiment of the invention.

By the above arrangements of the lenses and stop ST4, the lens assembly 4 of the fourth embodiment can meet the requirements of optical performance as seen in FIGS. 8A-8C, wherein FIG. 8A shows a field curvature diagram of the lens assembly 4 in accordance with the fourth embodiment of the invention, FIG. 8B shows a distortion diagram of the lens assembly 4 in accordance with the fourth embodiment of the invention, and FIG. 8C shows a modulation transfer function diagram of the lens assembly 4 in accordance with the fourth embodiment of the invention.

It can be seen from FIG. 8A that the field curvature of tangential direction and sagittal direction in the lens assembly 4 of the fourth embodiment ranges from −0.03 mm to 0.05 mm for the wavelength of 0.439 μm, 0.546 μm, 0.573 μm, 0.587 μm, and 0.656 μm.

It can be seen from FIG. 8B that the distortion in the lens assembly 4 of the fourth embodiment ranges from 0% to 2.0% for the wavelength of 0.439 μm, 0.546 μm, 0.573 μm, 0.587 μm, and 0.656 μm.

It can be seen from FIG. 8C that the modulation transfer function of tangential direction and sagittal direction in the lens assembly 4 of the fourth embodiment ranges from 0.38 to 1.0 wherein the wavelength ranges from 0.4385 μm to 0.6563 μm, the fields respectively are 0.0000 mm, 0.5867 mm, 1.1734 mm, 1.4668 mm, 2.0535 mm, 2.6402 mm, and 2.9335 mm, and the spatial frequency ranges from 0 lp/mm to 125 lp/mm.

It is obvious that the field curvature and the distortion of the lens assembly 4 of the fourth embodiment can be corrected effectively, and the resolution of the lens assembly 4 of the fourth embodiment can meet the requirement. Therefore, the lens assembly 4 of the fourth embodiment is capable of good optical performance.

Referring to FIG. 9, FIG. 9 is a lens layout and optical path diagram of a lens assembly in accordance with a fifth embodiment of the invention. The lens assembly 5 includes a first lens L51, a second lens L52, a stop ST5, a third lens L53, a fourth lens L54, a fifth lens L55, a sixth lens L56, and an optical filter OF5, all of which are arranged in order from an object side to an image side along an optical axis OA5. In operation, an image of light rays from the object side is formed at an image plane IMA5.

The first lens L51 is a biconvex lens with positive refractive power and made of plastic material, wherein the object side surface S51 is a convex surface, the image side surface S52 is a convex surface, and both of the object side surface S51 and image side surface S52 are aspheric surfaces.

The second lens L52 is a biconcave lens with negative refractive power and made of plastic material, wherein the object side surface S53 is a concave surface, the image side surface S54 is a concave surface, and both of the object side surface S53 and image side surface S54 are aspheric surfaces.

The third lens L53 is a biconvex lens with positive refractive power and made of plastic material, wherein the object side surface S56 is a convex surface, the image side surface S57 is a convex surface, and both of the object side surface S56 and image side surface S57 are aspheric surfaces.

The fourth lens L54 is a biconcave lens with negative refractive power and made of plastic material, wherein the object side surface S58 is a concave surface, the image side surface S59 is a concave surface, and both of the object side surface S58 and image side surface S59 are aspheric surfaces.

The fifth lens L55 is a meniscus lens with positive refractive power and made of plastic material, wherein the object side surface S510 is a concave surface, the image side surface S511 is a convex surface, and both of the object side surface S510 and image side surface S511 are aspheric surfaces.

The sixth lens L56 is a biconcave lens with negative refractive power and made of plastic material, wherein the object side surface S512 is a concave surface, the image side surface S513 is a concave surface, and both of the object side surface S512 and image side surface S513 are aspheric surfaces Both of the object side surface S514 and image side surface S515 of the optical filter OF5 are plane surfaces.

In order to maintain excellent optical performance of the lens assembly in accordance with the fifth embodiment of the invention, the lens assembly 5 satisfies at least one of the following conditions:

$$FOV5 \leq 56° \quad (31)$$

$$4 \text{ mm} < TTL5 - SL5 < 9 \text{ mm} \quad (32)$$

$$f5_1 + f5_2 < -1 \text{ mm} \quad (33)$$

$$-25 \text{ mm} < f5_2 + f5_4 < -1.5 \text{ mm} \quad (34)$$

$$-4 \leq f5_2/f5 \leq 0 \quad (35)$$

$$2 \text{ mm} < f5_5 + f5_6 < 35 \text{ mm} \quad (36)$$

$$25 < V5_1 - V5_2 < 38 \quad (37)$$

$$-21.5 \leq (R5_{41} - R5_{42})/(R5_{41} + R5_{42}) \leq 3.5 \quad (38)$$

The definition of FOV5, TTL5, SL5, $f5_1$, $f5_2$, $f5_4$, $f5_5$, $f5_6$, f5, $V5_1$, $V5_2$, $R5_{41}$, and $R5_{42}$ are the same as that of FOV3, TTL3, SL3, $f3_1$, $f3_2$, $f3_4$, $f3_5$, $f3_6$, f3, $V3_1$, $V3_2$, $R3_{41}$, and $R3_{42}$ in the third embodiment, and is not described here again.

By the above design of the lenses, stop ST5, and satisfies at least one of the conditions (31)-(38), the lens assembly 5 is provided with an effective shortened total lens length, an effective decreased field of view, an increased resolution, and an effective corrected aberration.

In order to achieve the above purposes and effectively enhance the optical performance, the lens assembly 5 in accordance with the fifth embodiment of the invention is provided with the optical specifications shown in Table 13, which include the effective focal length, F-number, total lens length, field of view, radius of curvature of each lens surface, thickness between adjacent surface, refractive index of each lens, Abbe number of each lens, and effective focal length of each lens. Table 13 shows that the effective focal length is equal to 7.0767 mm, F-number is equal to 2.8, total lens length is equal to 7.533 mm, and field of view is equal to 45 degrees for the lens assembly 5 of the fifth embodiment of the invention.

TABLE 13

Effective Focal Length = 7.076 mm F-number = 2.8
Total Lens Length = 7.533 mm Field of View = 45 Degrees

| Surface Number | Radius of Curvature (mm) | Thickness (mm) | Nd | Vd | Effective Focal Length (mm) | Remark |
|---|---|---|---|---|---|---|
| S51 | 2.341 | 2.13 | 1.535 | 56.115 | 4.275 | The First Lens L51 |
| S52 | −73.615 | 0.04 | | | | |
| S53 | −351.363 | 0.48 | 1.661 | 28.800 | −6.395 | The Second Lens L52 |
| S54 | 4.3 | 0.31 | | | | |
| S55 | ∞ | 0.07 | | | | Stop ST5 |
| S56 | 8.459 | 1.37 | 1.661 | 26.800 | 8.134 | The Third Lens L53 |
| S57 | −13.970 | 0.21 | | | | |
| S58 | −7.870 | 0.39 | 1.661 | 24.700 | −9.582 | The Fourth Lens L54 |
| S59 | 33.838 | 0.46 | | | | |
| S510 | −6.000 | 0.40 | 1.661 | 20.373 | 27.959 | The Fifth Lens L55 |
| S511 | −4.655 | 0.24 | | | | |
| S512 | −6.795 | 0.50 | 1.661 | 20.373 | −5.431 | The Sixth Lens L56 |
| S513 | 7.905 | 0.27 | | | | |
| S514 | ∞ | 0.21 | 1.517 | 64.167 | | Optical Filter OF5 |
| S515 | ∞ | 0.44 | | | | |

The aspheric surface sag z of each lens in table 13 can be calculated by the following formula:

$$z = ch^2/\{1+[1-(k+1)c^2h^2]^{1/2}\} + Ah^4 + Bh^6 + Ch^8 + Dh^{10} + Eh^{12} + Fh^{14} + Gh^{16}$$

where c is curvature, h is the vertical distance from the lens surface to the optical axis, k is conic constant and A, B, C, D, E, F and G are aspheric coefficients.

In the fifth embodiment, the conic constant k and the aspheric coefficients A, B, C, D, E, F, G of each surface are shown in Table 14.

TABLE 14

| Surface Number | k / D | A / E | B / F | C / G |
|---|---|---|---|---|
| S51 | −0.627 | 3.62E−03 | −4.44E−04 | 2.79E−04 |
| | −8.98E−05 | 0.00E+00 | 0.00E+00 | 0.00E+00 |
| S52 | 0 | −1.91E−02 | 1.44E−02 | −4.36E−03 |
| | 3.99E−04 | 0.00E+00 | 0.00E+00 | 0.00E+00 |
| S53 | 0 | −2.79E−04 | 1.88E−02 | −3.93E−03 |
| | 6.12E−04 | 0.00E+00 | 0.00E+00 | 0.00E+00 |
| S54 | 14.006 | −8.88E−03 | 1.20E−02 | −4.76E−03 |
| | −2.79E−03 | 0.00E+00 | 0.00E+00 | 0.00E+00 |

TABLE 14-continued

| Surface Number | k / D | A / E | B / F | C / G |
|---|---|---|---|---|
| S56 | 0 | −2.97E−02 | −2.54E−02 | 5.65E−02 |
| | −2.84E−02 | −8.93E−02 | 1.60E−01 | −7.94E−02 |
| S57 | 0 | −1.69E−01 | 3.93E−02 | −2.05E−02 |
| | 1.68E−02 | 1.44E−02 | −5.70E−03 | −2.51E−03 |
| S58 | 24.344 | −2.12E−01 | 1.84E−02 | 1.70E−02 |
| | 4.91E−02 | −4.10E−03 | −2.07E−02 | 5.78E−03 |
| S59 | 488.898 | −2.37E−02 | 1.75E−02 | −8.86E−04 |
| | −1.91E−03 | 1.26E−03 | −5.86E−04 | 1.01E−04 |
| S510 | −49.446 | 3.31E−02 | 1.62E−02 | −2.43E−02 |
| | 7.66E−03 | 1.45E−04 | −6.97E−04 | 1.23E−04 |
| S511 | −25.672 | −6.38E−03 | 1.08E−02 | −7.99E−04 |
| | −7.18E−04 | 9.13E−05 | −1.66E−05 | 4.43E−06 |
| S512 | −3.722 | −5.61E−02 | 1.13E−02 | 5.35E−03 |
| | −9.31E−04 | −2.79E−04 | 4.40E−05 | 1.08E−06 |
| S513 | 4.931 | −7.33E−02 | 2.37E−02 | −5.01E−03 |
| | 5.34E−04 | 8.33E−06 | −1.03E−05 | 7.74E−07 |

Table 15 shows the parameters and condition values for conditions (31)-(38). As can be seen from Table 15, the lens assembly 5 of the fifth embodiment satisfies the conditions (31)-(38).

TABLE 15

| | | | | | |
|---|---|---|---|---|---|
| FOV5 | 45 Degrees | TTL5 | 7.533 mm | SL5 | 2.960 mm |
| $f5_1$ | 4.275 mm | $f5_2$ | −6.395 mm | $f5_4$ | −9.582 mm |
| $f5_5$ | 27.959 mm | $f5_6$ | −5.431 mm | f5 | 7.076 mm |
| $V5_1$ | 56.115 | $V5_2$ | 28.800 | $R5_{41}$ | −7.870 mm |
| $R5_{42}$ | 33.838 mm | | | | |
| FOV5 | 45 Degrees | TTL5 − SL5 | 4.573 mm | $f5_1 + f5_2$ | −2.12 mm |
| $f5_2 + f5_4$ | −15.977 mm | $f5_2/f5$ | −0.904 | $f5_5 + f5_6$ | 22.528 mm |
| $V5_1 − V5_2$ | 35.74 | $(R5_{41} − R5_{42})/(R5_{41} + R5_{42})$ | −1.606 | | |

Figure 10A:
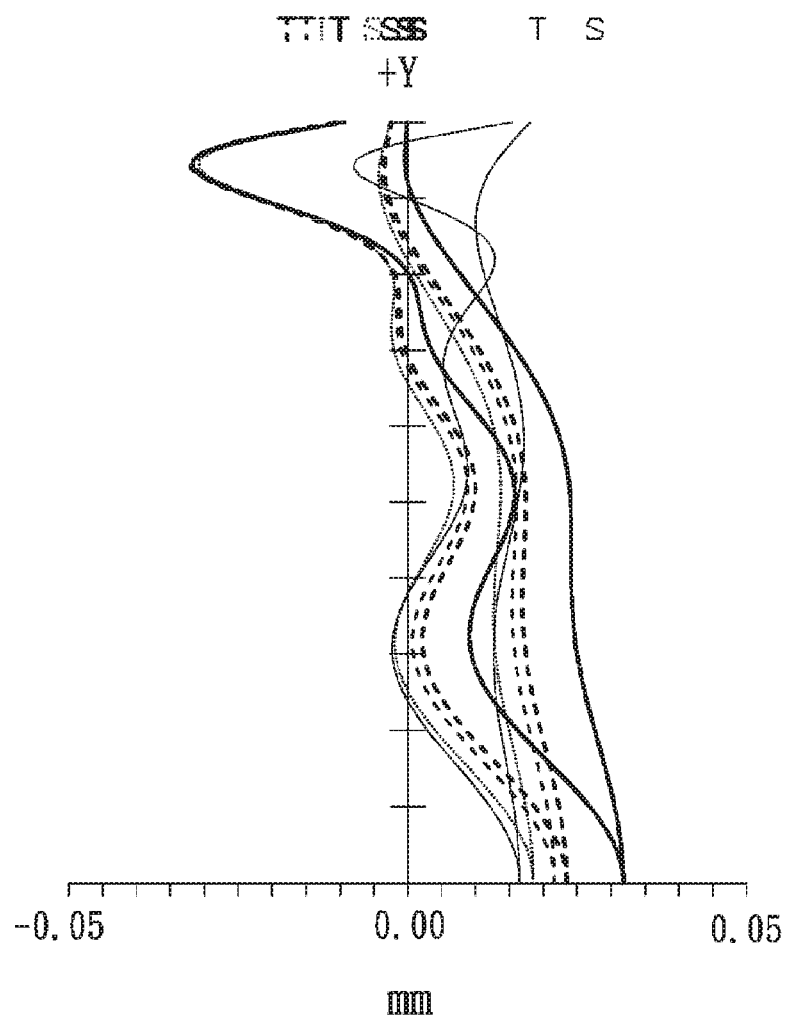
FIG. 10A depicts a field curvature diagram of the lens assembly in accordance with the fifth embodiment of the invention.
Figure 10B:
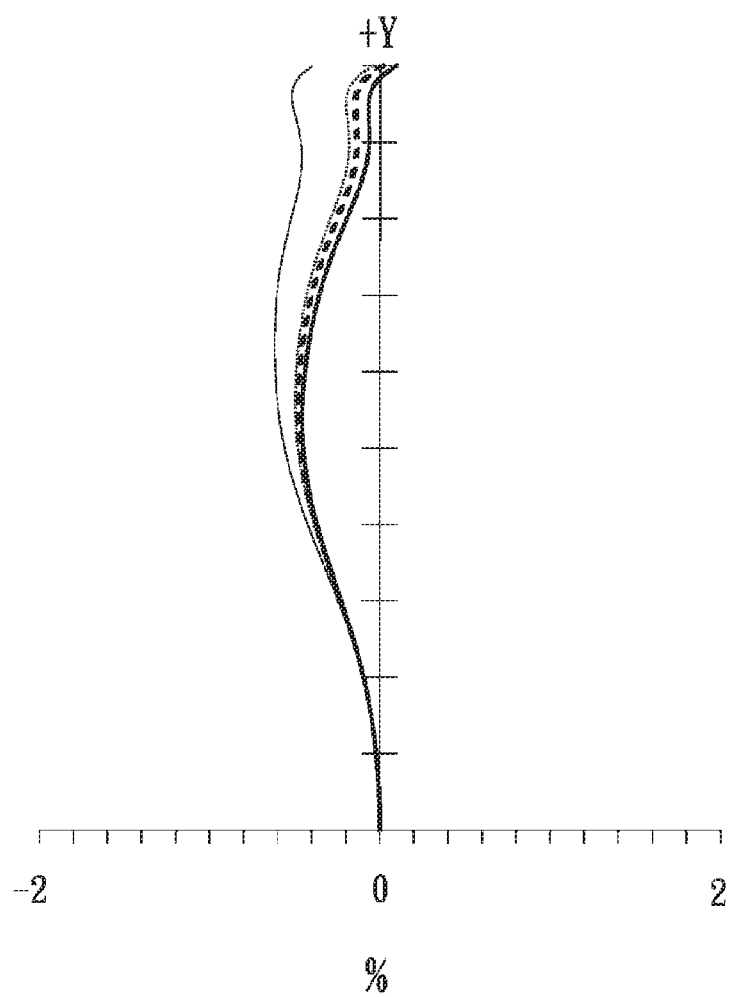
FIG. 10B is a distortion diagram of the lens assembly in accordance with the fifth embodiment of the invention.
Figure 10C:
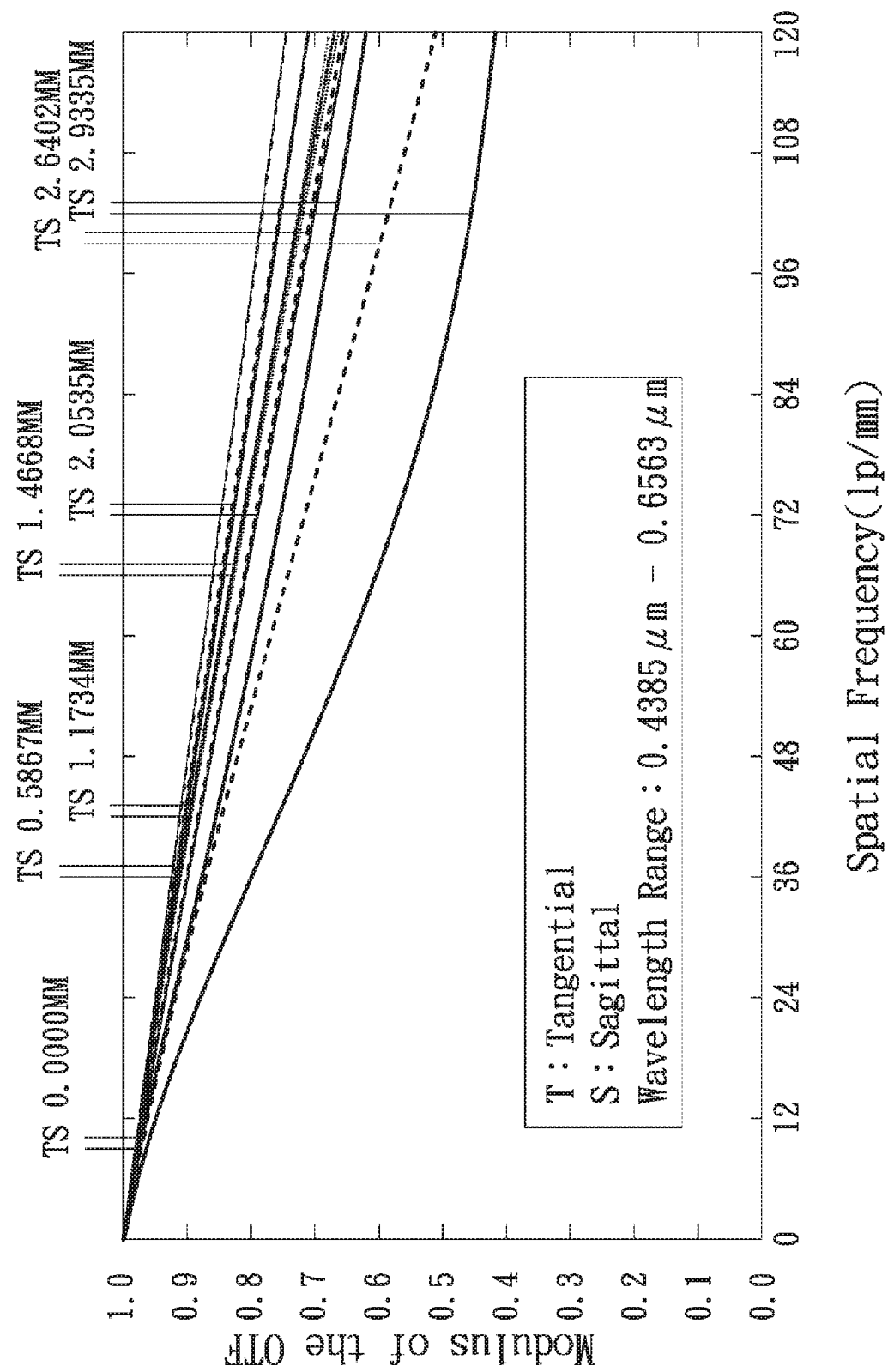
FIG. 10C is a modulation transfer function diagram of the lens assembly in accordance with the fifth embodiment of the invention.

By the above arrangements of the lenses and stop ST5, the lens assembly 5 of the fifth embodiment can meet the requirements of optical performance as seen in FIGS. 10A-10C, wherein FIG. 10A shows a field curvature diagram of the lens assembly 5 in accordance with the fifth embodiment of the invention, FIG. 10B shows a distortion diagram of the lens assembly 5 in accordance with the fifth embodiment of the invention, and FIG. 10C shows a modulation transfer function diagram of the lens assembly 5 in accordance with the fifth embodiment of the invention.

It can be seen from FIG. 10A that the field curvature of tangential direction and sagittal direction in the lens assembly 5 of the fifth embodiment ranges from −0.035 mm to 0.035 mm for the wavelength of 0.436 µm, 0.546 µm, 0.573 µm, 0.587 µm, and 0.656 µm.

It can be seen from FIG. 10B that the distortion in the lens assembly 5 of the fifth embodiment ranges from −0.8% to 0.2% for the wavelength of 0.436 µm, 0.546 µm, 0.573 µm, 0.587 µm, and 0.656 µm.

It can be seen from FIG. 10C that the modulation transfer function of tangential direction and sagittal direction in the lens assembly 5 of the fifth embodiment ranges from 0.41 to 1.0 wherein the wavelength ranges from 0.4358 µm to 0.6563 µm, the fields respectively are 0.0000 mm, 0.5867 mm, 1.1734 mm, 1.4668 mm, 2.0535 mm, 2.6402 mm, and 2.9335 mm, and the spatial frequency ranges from 0 lp/mm to 120 lp/mm.

It is obvious that the field curvature and the distortion of the lens assembly 5 of the fifth embodiment can be corrected effectively, and the resolution of the lens assembly 5 of the fifth embodiment can meet the requirement. Therefore, the lens assembly 5 of the fifth embodiment is capable of good optical performance.

Referring to Table 16 and Table 17, Table 16 provides optical specifications in accordance with a sixth embodiment of the invention; Table 17 provides aspheric coefficients of each surface in Table 16.

The figure which depicts the lens layout diagram of the lens assembly in accordance with the sixth embodiment of the invention is similar to the figure which depicts the lens layout diagram of the lens assembly in accordance with the third embodiment of the invention, thus the figure which depicts the lens layout diagram of the lens assembly in accordance with the sixth embodiment of the invention is omitted.

Table 16 shows that the effective focal length is equal to 7.076 mm, F-number is equal to 2.8, total lens length is equal to 7.7533 mm, and field of view is equal to 45 degrees for the lens assembly of the sixth embodiment of the invention.

TABLE 16

Effective Focal Length = 7.076 mm F-number = 2.8
Total Lens Length = 7.7533 mm Field of View = 45 Degrees

| Surface Number | Radius of Curvature (mm) | Thickness (mm) | Nd | Vd | Effective Focal Length (mm) | Remark |
|---|---|---|---|---|---|---|
| S61 | ∞ | −0.346 | | | | Stop ST6 |
| S62 | 2.087953 | 0.684262 | 1.535218 | 56.11525 | 3.849 | The First Lens L61 |
| S63 | −154.0975 | 0.150804 | | | | |
| S64 | −16.56542 | 0.324744 | 1.661342 | 28.8 | −5.817 | The Second Lens L62 |
| S65 | 5.076681 | 0.065043 | | | | |
| S66 | 7.150339 | 1.594457 | 1.661342 | 26.8 | 5.011 | The Third Lens L63 |
| S67 | −3.914118 | 0.029974 | | | | |
| S68 | −5.237808 | 1.100006 | 1.661342 | 24.7 | −7.414 | The Fourth Lens L64 |
| S69 | 89.06507 | 0.041966 | | | | |
| S610 | 26.85975 | 1.238261 | 1.662342 | 20.3729 | 29.636 | The Fifth Lens L65 |
| S611 | −72.18347 | 0.678644 | | | | |
| S612 | −13.26351 | 0.499951 | 1.661342 | 20.3729 | −3.702 | The Sixth Lens L66 |
| S613 | 3.062019 | 0.27 | | | | |
| S614 | ∞ | 0.21 | 1.5168 | 64.16734 | | Optical Filter OF6 |
| S615 | ∞ | 0.437948 | | | | |

The aspheric surface sag z of each lens in table 16 can be calculated by the following formula:

$$z = ch^2/\{1+[1-(k+1)c^2h^2]^{1/2}\} + Ah^4 + Bh^6 + Ch^8 + Dh^{10} + Eh^{12} + Fh^{14} + Gh^{16}$$

where c is curvature, h is the vertical distance from the lens surface to the optical axis, k is conic constant and A, B, C, D, E, F and G are aspheric coefficients.

In the sixth embodiment, the conic constant k and the aspheric coefficients A, B, C, D, E, F, G of each surface are shown in Table 17.

TABLE 17

| Surface Number | K D | A E | B F | C G |
|---|---|---|---|---|
| S62 | 0 0.00E+00 | 0.00E+00 0.00E+00 | 0.00E+00 0.00E+00 | 0.00E+00 0.00E+00 |
| S63 | 0 0.00E+00 | 0.00E+00 0.00E+00 | 0.00E+00 0.00E+00 | 0.00E+00 0.00E+00 |
| S64 | 0 0.00E+00 | 0.00E+00 0.00E+00 | 0.00E+00 0.00E+00 | 0.00E+00 0.00E+00 |
| S65 | 0 0.00E+00 | 0.00E+00 0.00E+00 | 0.00E+00 0.00E+00 | 0.00E+00 0.00E+00 |
| S66 | 0 0.00E+00 | 0.00E+00 0.00E+00 | 0.00E+00 0.00E+00 | 0.00E+00 0.00E+00 |
| S67 | 3.341941 0.00E+00 | 0.00E+00 0.00E+00 | 0.00E+00 0.00E+00 | 0.00E+00 0.00E+00 |
| S68 | 0 0.00E+00 | 0.00E+00 0.00E+00 | 0.00E+00 0.00E+00 | 0.00E+00 0.00E+00 |
| S69 | 0 0.00E+00 | 0.00E+00 0.00E+00 | 0.00E+00 0.00E+00 | 0.00E+00 0.00E+00 |
| S610 | 0 0.00E+00 | 0.00E+00 0.00E+00 | 0.00E+00 0.00E+00 | 0.00E+00 0.00E+00 |
| S611 | −21025.33 0.00E+00 | 0.00E+00 0.00E+00 | 0.00E+00 0.00E+00 | 0.00E+00 0.00E+00 |

TABLE 17-continued

| Surface Number | K<br>D | A<br>E | B<br>F | C<br>G |
|---|---|---|---|---|
| S612 | 36.54096<br>0.00E+00 | 0.00E+00<br>0.00E+00 | 0.00E+00<br>0.00E+00 | 0.00E+00<br>0.00E+00 |
| S613 | −0.898173<br>0.00E+00 | 0.00E+00<br>0.00E+00 | 0.00E+00<br>0.00E+00 | 0.00E+00<br>0.00E+00 |

The difference between the above sixth embodiment of the lens assembly and the third embodiment of the lens assembly is that the image side surface S63 of the first lens L61 is a convex surface for the sixth embodiment of the lens assembly, however, the image side surface S33 of the first lens L31 is a concave surface for the third embodiment of the lens assembly.

The above field curvature (figure is omitted) and distortion (figure is omitted) for the sixth embodiment of the lens assembly can be corrected effectively, and the resolution for the sixth embodiment of the lens assembly can meet the requirement. Therefore, the lens assembly of the sixth embodiment is capable of good optical performance.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A lens assembly comprising:
a first lens which is with positive refractive power and comprises a convex surface facing an object side;
a second lens which is with negative refractive power and comprises a concave surface facing an image side;
a third lens which is with refractive power and comprises a convex surface in a paraxial region facing the image side;
a fourth lens which is with refractive power;
a fifth lens which is with refractive power; and
a sixth lens which is with refractive power;
wherein the first lens, the second lens, the third lens, the fourth lens, the fifth lens, and the sixth lens are arranged in order from the object side to the image side along an optical axis;
wherein the lens assembly satisfies:

2 mm<$f_5+f_6$<35 mm, wherein $f_5$ is an effective focal length of the fifth lens and $f_6$ is an effective focal length of the sixth lens.

2. The lens assembly as claimed in claim 1, wherein the third lens is with positive refractive power and the fourth lens is with negative refractive power.

3. The lens assembly as claimed in claim 2, wherein the fifth lens is with positive refractive power and the sixth lens is with negative refractive power.

4. The lens assembly as claimed in claim 1, wherein the second lens further comprises another concave surface facing the object side, the third lens further comprises another convex surface facing the object side, the fourth lens is a biconcave lens, and the sixth lens is a biconcave lens.

5. The lens assembly as claimed in claim 4, wherein the fifth lens is a biconvex lens.

6. The lens assembly as claimed in claim 5, wherein the first lens further comprises a concave surface facing the image side.

7. The lens assembly as claimed in claim 5, wherein the first lens further comprises another convex surface facing the image side.

8. The lens assembly as claimed in claim 4, wherein the fifth lens is a meniscus lens.

9. The lens assembly as claimed in claim 8, wherein the first lens further comprises a concave surface facing the image side.

10. The lens assembly as claimed in claim 8, wherein the first lens further comprises another convex surface facing the image side.

11. The lens assembly as claimed in claim 2, wherein the lens assembly satisfies:

−21.5≤$(R1_{41}-R1_{42})/(R1_{41}+R1_{42})$≤3.5, wherein $R_{41}$ is a radius of curvature of an object side surface of the fourth lens and $R_{42}$ is a radius of curvature of an image side surface of the fourth lens.

12. The lens assembly as claimed in claim 3, further comprising a stop disposed between the object side and the third lens, wherein the lens assembly satisfies:

4 mm<$TTL-SL$<9 mm, wherein TTL is an interval from the convex surface of the first lens to an image plane along the optical axis and SL is an interval from the convex surface of the first lens to the stop along the optical axis.

13. The lens assembly as claimed in claim 4, wherein the lens assembly satisfies:

$f_1+f_2$<−1 mm, wherein $f_1$ is an effective focal length of the first lens and $f_2$ is an effective focal length of the second lens.

14. The lens assembly as claimed in claim 13, wherein the lens assembly satisfies:

−4≤$f_2/f$≤0, wherein $f_2$ is an effective focal length of the second lens and f is an effective focal length of the lens assembly.

15. The lens assembly as claimed in claim 3, wherein the lens assembly satisfies:

25<$V_1-V_2$<38, wherein $V_1$ is an Abbe number of the first lens and $V_2$ is an Abbe number of the second lens.

16. The lens assembly as claimed in claim 2, wherein the lens assembly satisfies:

−25 mm<$f_2+f_4$<−1.5 mm, wherein $f_2$ is an effective focal length of the second lens and $f_4$ is an effective focal length of the fourth lens.

17. The lens assembly as claimed in claim 15, wherein the lens assembly satisfies:

FOV≤56°, wherein FOV is a field of view of the lens assembly.

18. The lens assembly as claimed in claim 1, wherein the first lens, the second lens, the third lens, the fourth lens, the fifth lens, and the sixth lens are aspheric lenses.

19. A lens assembly comprising:
a first lens which is with positive refractive power and comprises a convex surface facing an object side;
a second lens which is with negative refractive power and comprises a concave surface facing an image side;
a third lens which is with refractive power and comprises a convex surface facing the image side;
a fourth lens which is with refractive power;
a fifth lens which is with refractive power; and a sixth lens which is with refractive power;
wherein the first lens, the second lens, the third lens, the fourth lens, the fifth lens, and the sixth lens are arranged in order from the object side to the image side along an optical axis;
wherein the lens assembly satisfies:

$$f_1+f_2<-1 \text{ mm},$$

wherein $f_1$ is an effective focal length of the first lens and $f_2$ is an effective focal length of the second lens.

20. A lens assembly comprising:
a first lens which is with positive refractive power and comprises a convex surface facing an object side;
a second lens which is with negative refractive power and comprises a concave surface facing an image side;
a third lens which is with refractive power and comprises a convex surface facing the image side;
a fourth lens which is with refractive power;
a fifth lens which is with refractive power;
a sixth lens which is with refractive power; and
a stop;
wherein the first lens, the second lens, the third lens, the fourth lens, the fifth lens, and the sixth lens are arranged in order from the object side to the image side along an optical axis;
wherein the stop is disposed between the object side and the third lens;
wherein the lens assembly satisfies:

$$-25 \text{ mm}<f_2+f_4<-1.5 \text{ mm},$$

wherein $f_2$ is an effective focal length of the second lens and $f_4$ is an effective focal length of the fourth lens.

* * * * *